US012588105B2

(12) United States Patent
Dudda et al.

(10) Patent No.: US 12,588,105 B2
(45) Date of Patent: Mar. 24, 2026

(54) DUAL ACTIVE PROTOCOL STACK (DAPS) HANDOVER DURING URLLC PACKET DUPLICATION

(71) Applicant: Telefonaktiebolaget LM Ericsson (publ), Stockholm (SE)

(72) Inventors: Torsten Dudda, Wassenberg (DE); Pontus Wallentin, Linköping (SE); Roman Zhohov, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 390 days.

(21) Appl. No.: 18/024,415

(22) PCT Filed: Sep. 3, 2020

(86) PCT No.: PCT/EP2020/074683
§ 371 (c)(1),
(2) Date: Mar. 2, 2023

(87) PCT Pub. No.: WO2022/048761
PCT Pub. Date: Mar. 10, 2022

(65) Prior Publication Data
US 2023/0269646 A1    Aug. 24, 2023

(51) Int. Cl.
*H04W 76/30*      (2018.01)
*H04W 36/00*      (2009.01)
*H04W 36/18*      (2009.01)
(52) U.S. Cl.
CPC ....... *H04W 76/30* (2018.02); *H04W 36/0038* (2013.01); *H04W 36/185* (2023.05)

(58) Field of Classification Search
CPC .... H04W 36/185; H04W 36/28; H04W 36/34
See application file for complete search history.

(56) References Cited

U.S. PATENT DOCUMENTS

| | | | |
|---|---|---|---|
| 11,252,624 B2* | 2/2022 | Kim .................... | H04W 36/185 |
| 2018/0098250 A1* | 4/2018 | Vrzic ................ | H04W 36/0016 |
| 2019/0289489 A1 | 9/2019 | Yi et al. | |
| 2020/0053566 A1* | 2/2020 | Kim ...................... | H04W 36/06 |
| 2020/0205050 A1* | 6/2020 | Shah ................. | H04W 74/0833 |

(Continued)

OTHER PUBLICATIONS

Ericsson, "Reconfiguration during DAPS HO", 3GPP TSG-RAN WG2 #113e, Electronic meeting, Jan. 25-Feb. 5, 2021, Tdoc R2-2100488, pp. 1-35.

(Continued)

*Primary Examiner* — Brian P Cox
(74) *Attorney, Agent, or Firm* — COATS & BENNETT, PLLC

(57) ABSTRACT

Techniques for inter base station handovers are provided for the case where a wireless device is operating in a PDCP packet duplication mode. The handover techniques enable the wireless device to transition from PDCP packet duplication with the source cell to DAPS and to transition back to PDCP packet duplication with the target cell when the handover is complete. In some embodiments, the RLC entities established with the source cell are preserved during the inter base station handover. The handover techniques ensure that QoS requirements for URLLC can be met during the inter base station handover.

24 Claims, 25 Drawing Sheets

(56) References Cited

U.S. PATENT DOCUMENTS

2021/0314831 A1 * 10/2021 Ozturk .............. H04W 36/0058
2023/0284113 A1 * 9/2023 Wu ...................... H04W 76/30
                                                      370/331

OTHER PUBLICATIONS

Huawei, "(TP for NR_Mob_enh BL CR for TS 38.300): Data forwarding for DAPS HO", 3GPP TSG-RAN3 Meeting #106, Reno, USA, Nov. 18-22, 2019, R3-196908, pp. 1-5.
Huawei, et al., "Draft CR for 38.323 on supporting DAPS handover", 3GPP TSG-RAN2 Meeting #108, Reno, US, Nov. 18-22, 2019, R2-1915351, pp. 1-16.
NEC, "CA duplication for SRB", 3GPP TSG-RAN WG2 NR Ad hoc 1801, Vancouver, Canada, Jan. 22-26, 2018, R2-1801137, pp. 1-2.

* cited by examiner

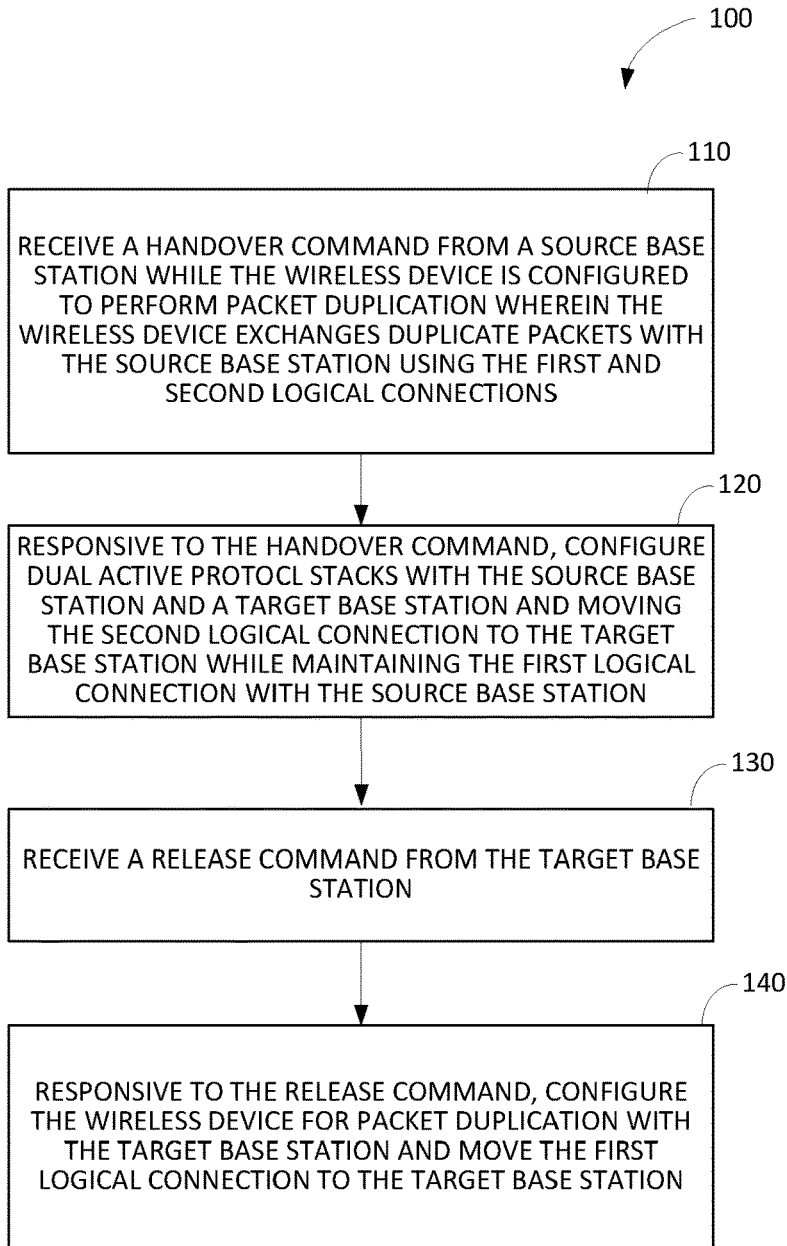

100

110

RECEIVE A HANDOVER COMMAND FROM A SOURCE BASE STATION WHILE THE WIRELESS DEVICE IS CONFIGURED TO PERFORM PACKET DUPLICATION WHEREIN THE WIRELESS DEVICE EXCHANGES DUPLICATE PACKETS WITH THE SOURCE BASE STATION USING THE FIRST AND SECOND LOGICAL CONNECTIONS

120

RESPONSIVE TO THE HANDOVER COMMAND, CONFIGURE DUAL ACTIVE PROTOCL STACKS WITH THE SOURCE BASE STATION AND A TARGET BASE STATION AND MOVING THE SECOND LOGICAL CONNECTION TO THE TARGET BASE STATION WHILE MAINTAINING THE FIRST LOGICAL CONNECTION WITH THE SOURCE BASE STATION

130

RECEIVE A RELEASE COMMAND FROM THE TARGET BASE STATION

140

RESPONSIVE TO THE RELEASE COMMAND, CONFIGURE THE WIRELESS DEVICE FOR PACKET DUPLICATION WITH THE TARGET BASE STATION AND MOVE THE FIRST LOGICAL CONNECTION TO THE TARGET BASE STATION

FIG. 9

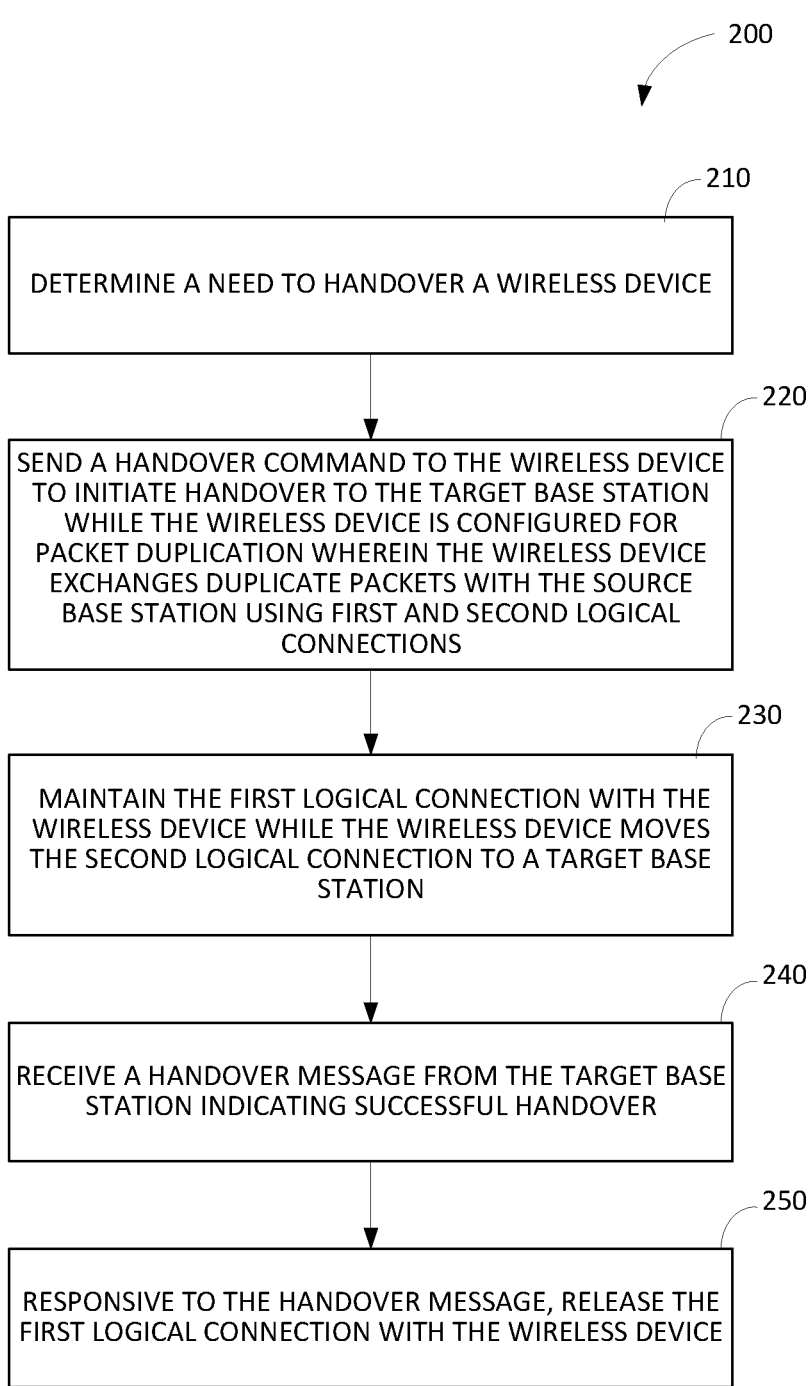

200

210

DETERMINE A NEED TO HANDOVER A WIRELESS DEVICE

220

SEND A HANDOVER COMMAND TO THE WIRELESS DEVICE TO INITIATE HANDOVER TO THE TARGET BASE STATION WHILE THE WIRELESS DEVICE IS CONFIGURED FOR PACKET DUPLICATION WHEREIN THE WIRELESS DEVICE EXCHANGES DUPLICATE PACKETS WITH THE SOURCE BASE STATION USING FIRST AND SECOND LOGICAL CONNECTIONS

230

MAINTAIN THE FIRST LOGICAL CONNECTION WITH THE WIRELESS DEVICE WHILE THE WIRELESS DEVICE MOVES THE SECOND LOGICAL CONNECTION TO A TARGET BASE STATION

240

RECEIVE A HANDOVER MESSAGE FROM THE TARGET BASE STATION INDICATING SUCCESSFUL HANDOVER

250

RESPONSIVE TO THE HANDOVER MESSAGE, RELEASE THE FIRST LOGICAL CONNECTION WITH THE WIRELESS DEVICE

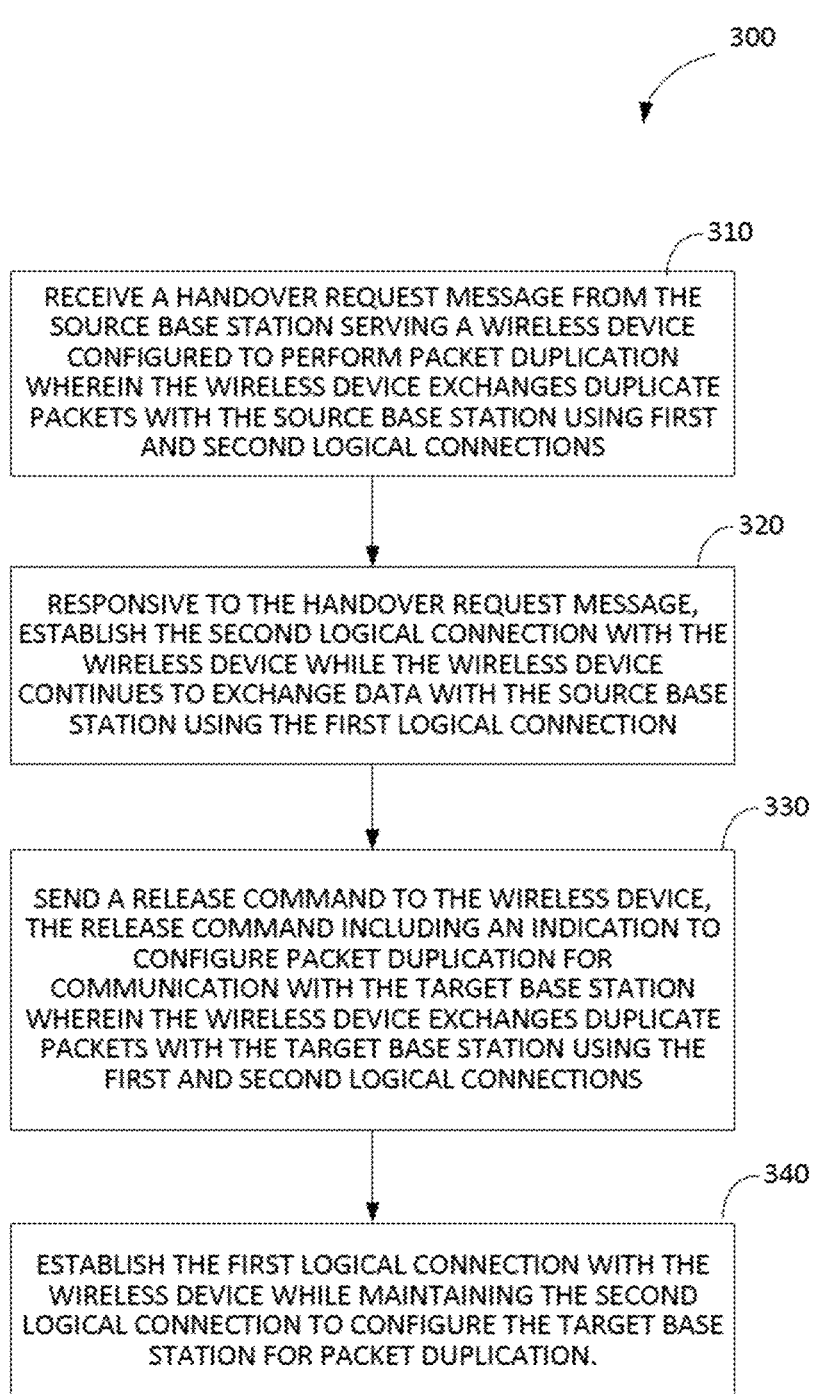

310

RECEIVE A HANDOVER REQUEST MESSAGE FROM THE SOURCE BASE STATION SERVING A WIRELESS DEVICE CONFIGURED TO PERFORM PACKET DUPLICATION WHEREIN THE WIRELESS DEVICE EXCHANGES DUPLICATE PACKETS WITH THE SOURCE BASE STATION USING FIRST AND SECOND LOGICAL CONNECTIONS

320

RESPONSIVE TO THE HANDOVER REQUEST MESSAGE, ESTABLISH THE SECOND LOGICAL CONNECTION WITH THE WIRELESS DEVICE WHILE THE WIRELESS DEVICE CONTINUES TO EXCHANGE DATA WITH THE SOURCE BASE STATION USING THE FIRST LOGICAL CONNECTION

330

SEND A RELEASE COMMAND TO THE WIRELESS DEVICE, THE RELEASE COMMAND INCLUDING AN INDICATION TO CONFIGURE PACKET DUPLICATION FOR COMMUNICATION WITH THE TARGET BASE STATION WHEREIN THE WIRELESS DEVICE EXCHANGES DUPLICATE PACKETS WITH THE TARGET BASE STATION USING THE FIRST AND SECOND LOGICAL CONNECTIONS

340

ESTABLISH THE FIRST LOGICAL CONNECTION WITH THE WIRELESS DEVICE WHILE MAINTAINING THE SECOND LOGICAL CONNECTION TO CONFIGURE THE TARGET BASE STATION FOR PACKET DUPLICATION.

COMMUNICATION CIR. <u>520</u>

PROCESSING CIR. <u>530</u>

MEMORY <u>540</u>

PROGRAM
<u>550</u>

DUAL ACTIVE PROTOCOL STACK (DAPS) HANDOVER DURING URLLC PACKET DUPLICATION

TECHNICAL FIELD

The present disclosure relates generally to inter base station handovers and, more particularly, to inter base station handovers of a wireless device configured for packet duplication.

BACKGROUND

The Fifth Generation (5G) New Radio (NR) standard under development by the Third Generation Partnership Project (3GPP) is being designed to provide service for multiple use cases, such as Enhanced Mobile Broadband (eMBB), Ultra-Reliable and Low Latency Communication (URLLC), and Machine-Type Communication (MTC). Each of these services has different technical requirements. For example, the general requirement for eMBB is high data rate with moderate latency and moderate coverage, while URLLC service requires low latency and high reliability transmission with moderate data rates.

One of the features to support these use cases is Packet Data Convergence Protocol (PDCP) packet duplication as specified in Technical Standard (TS) 38.300 v16.1. When PDCP packet duplication is configured for a radio bearer by Radio Resource Control (RRC), at least one secondary Radio Link Control (RLC) entity in addition to the primary RLC entity is added to the radio bearer to handle the duplicated PDCP packet data units (PDUs). The logical channel corresponding to the primary RLC entity is referred to as the primary logical channel, and the logical channel corresponding to a secondary RLC entity is referred to as a secondary logical channel. A wireless device can be configured with multiple secondary RLC entities. When PDCP packet duplication is configured, the same PDCP PDUs are submitted multiple times; once to each activated RLC entity for the radio bearer. By providing multiple independent transmission paths, PDCP packet duplication increases reliability and reduces latency and is especially beneficial for URLLC services.

Even when PDCP packet duplication is employed, there remains a problem of how to meet URLLC Quality of Service (QoS) requirements during an inter base station handover. During the handover, the wireless device needs to perform a random access (RA) procedure with the target base station to establish a connection with the target base station. After performing the RA procedure with the target base station, the wireless device is no longer able to provide a feedback to the source base station which can degrade reliability and require additional signaling, e.g., to provide a sequence number (SN) check. Additionally, there is a risk that the handover will fail resulting in service disruption and further signaling with attendant delays to re-establish a connection to the network. Some of these risks can be mitigated by performing a make-before-break handover, known as Dual Active Protocol Stack (DAPS) handover, but the DAPS handover is not compatible with PDCP packet duplication.

SUMMARY

The present disclosure relates generally to inter base station handovers for the case when a wireless device configured for PDCP packet duplication. The techniques as herein described enable the wireless device to transition from PDCP packet duplication with the source base station to DAPS and to transition back to PDCP packet duplication with the target base station. In some embodiments, the RLC entities established for the source base station are preserved during the inter base station handover. The handover techniques ensure that QoS requirements for URLLC can be met during the inter base station handover.

A first aspect of the disclosure comprises a handover method implemented by a wireless device. The method comprises receiving a handover command from a source base station while the wireless device is configured to perform packet duplication wherein the wireless device exchanges duplicate packets with the source base station using the first and second logical connections. The method further comprises, responsive to the handover command, configuring dual active protocol stacks with the source base station and target base station and moving the second logical connection to the target base station while maintaining the first logical connection to the source base station. The method further comprises receiving a release command from the target base station. The method further comprises, responsive to the release command, configuring the wireless device for packet duplication with the target base station and moving the first logical connection to the target base station.

A second of the disclosure comprises a wireless device configured to perform an inter base station handover. The wireless device is configured to receive a handover command from a source base station while the wireless device is configured to perform packet duplication wherein the wireless device exchanges duplicate packets with the source base station using the first and second logical connections. The wireless device is further configured to, responsive to the handover command, configure dual active protocol stacks with the source base station and target base station and move the second logical connection to the target base station while maintaining the first logical connection to the source base station. The wireless device is further configured to receive a release command from the target base station. The wireless device is further configured to, responsive to the release command, configure the wireless device for duplication with the target base station and move the first logical connection to the target base station.

A third aspect of the disclosure comprises a wireless device configured to perform an inter base station handover. The wireless device comprises communication circuitry for communicating with base stations in a wireless communication network and processing circuitry operatively coupled to the communication circuitry. The processing circuitry is configured to receive a handover command from a source base station while the wireless device is configured to perform packet duplication wherein the wireless device exchanges duplicate packets with the source base station using the first and second logical connections. The processing circuitry is further configured to, responsive to the handover command, configure dual active protocol stacks with the source base station and target base station and move the second logical connection to the target base station while maintaining the first logical connection to the source base station. The processing circuitry is further configured to receive a release command from the target base station. The processing circuitry is further configured to, responsive to the release command, configure the wireless device for duplication with the target base station and move the first logical connection to the target base station.

A fourth of the disclosure comprises a computer program comprising executable instructions that, when executed by a processing circuit in a wireless device, causes the wireless device to perform the method according to the first aspect.

A fifth of the disclosure comprises a carrier containing a computer program according to the fourth aspect, wherein the carrier is one of an electronic signal, optical signal, radio signal, or computer readable storage medium.

A sixth aspect of the disclosure comprises a method implemented by a source base station to handover a wireless device to a target base station. The method comprises determining a need to handover a wireless device and sending a handover command to the wireless device to initiate handover to the target base station while the wireless device is configured for packet duplication wherein the wireless device exchanges duplicate packets with the source base station using first and second logical connections. The method further comprises maintaining the first logical connection with the wireless device while the wireless device moves the second logical connection to the target base station. The method further comprises receiving a handover message from the target base station indicating successful handover, and, responsive to the handover message, releasing the first logical connection with the wireless device.

A seventh aspect of the disclosure comprises a source base station configured to handover a wireless device to a target base station. The source base station is configured to determine a need to handover a wireless device and sending a handover command to the wireless device to initiate handover to the target base station while the wireless device is configured for packet duplication wherein the wireless device exchanges duplicate packets with the source base station using first and second logical connections. The source base station is further configured to maintain the first logical connection with the wireless device while the wireless device moves the second logical connection to the target base station. The source base station is further configured to receive a handover message from the target base station indicating successful handover, and, responsive to the handover message, releasing the first logical connection with the wireless device.

An eighth aspect of the disclosure comprises a source base station configured to handover a wireless device to a target base station. The source base station comprises communication circuitry for communicating with a wireless device and processing circuitry operatively coupled to the communication circuitry. The processing circuitry is configured determine a need to handover a wireless device and sending a handover command to the wireless device to initiate handover to the target base station while the wireless device is configured for packet duplication wherein the wireless device exchanges duplicate packets with the source base station using first and second logical connections. The processing circuitry is further configured to maintain the first logical connection with the wireless device while the wireless device moves the second logical connection to the target base station. The processing circuitry is further configured to receive a handover message from the target base station indicating successful handover, and, responsive to the handover message, releasing the first logical connection with the wireless device.

A ninth of the disclosure comprises a computer program comprising executable instructions that, when executed by a processing circuit in a source base station, causes the source base station to perform the method according to the sixth aspect.

A tenth of the disclosure comprises a carrier containing a computer program according to the ninth aspect, wherein the carrier is one of an electronic signal, optical signal, radio signal, or computer readable storage medium.

An eleventh aspect of the disclosure comprises a method implemented by a target base station to handover a wireless device from a source base station. The method comprises receiving a handover request message from the source base station serving a wireless device configured to perform packet duplication wherein the wireless device exchanges duplicate packets with the source base station using first and second logical connections. The method further comprises, responsive to the handover request message, establishing the second logical connection with the wireless device while the wireless device continues to exchange data with the source base station using the first logical connection. The method further comprises sending a release command to the wireless device. The release command includes an indication to configure packet duplication for communication with the target base station wherein the wireless device exchanges duplicate packets with the target base station using the first and second logical connections. The method further comprises establishing the first logical connection with the wireless device while maintaining the second logical connection to configure the target base station for packet duplication.

A twelfth aspect of the disclosure comprises a target base station configured to handover a wireless device from a source base station. The target base station is configured to receive a handover request message from the source base station serving a wireless device configured to perform packet duplication wherein the wireless device exchanges duplicate packets with the source base station using first and second logical connections. The target base station is further configured to, responsive to the handover request message, establish the second logical connection with the wireless device while the wireless device continues to exchange data with the source base station using the first logical connection. The method further comprises sending a release command to the wireless device. The release command includes an indication to configure packet duplication for communication with the target base station wherein the wireless device exchanges duplicate packets with the target base station using the first and second logical connections. The target base station is further configured to establish the first logical connection with the wireless device while maintaining the second logical connection to configure the target base station for packet duplication.

A thirteenth aspect of the disclosure comprises a target base station configured to handover a wireless device from a source base station. The target base station comprises communication circuitry for communicating with a wireless device and processing circuitry operatively coupled to the communication circuitry. The processing circuitry is configured to receive a handover request message from the source base station serving a wireless device configured to perform packet duplication wherein the wireless device exchanges duplicate packets with the source base station using first and second logical connections. The processing circuitry is further configured to, responsive to the handover request message, establish the second logical connection with the wireless device while the wireless device continues to exchange data with the source base station using the first logical connection. The method further comprises sending a release command to the wireless device. The release command includes an indication to configure packet duplication for communication with the target base station wherein the wireless device exchanges duplicate packets with the target base station using the first and second logical connections.

The processing circuitry is further configured to establish the first logical connection with the wireless device while maintaining the second logical connection to configure the target base station for packet duplication.

A fourteenth of the disclosure comprises a computer program comprising executable instructions that, when executed by a processing circuit in a target base station, causes the target base station to perform the method according to the eleventh aspect.

A fifteenth of the disclosure comprises a carrier containing a computer program according to the fourteenth aspect, wherein the carrier is one of an electronic signal, optical signal, radio signal, or computer readable storage medium.

BRIEF DESCRIPTION OF THE DRAWINGS

FIG. 9 illustrates an exemplary handover method implemented by a wireless device configured for PDCP packet duplication.

FIG. 10 illustrates an exemplary handover method implemented by a source base station to handover a wireless device configured for PDCP packet duplication.

FIG. 11 illustrates an exemplary handover method implemented by a target base station to handover a wireless device configured for PDCP packet duplication.

DETAILED DESCRIPTION

Figure 1:
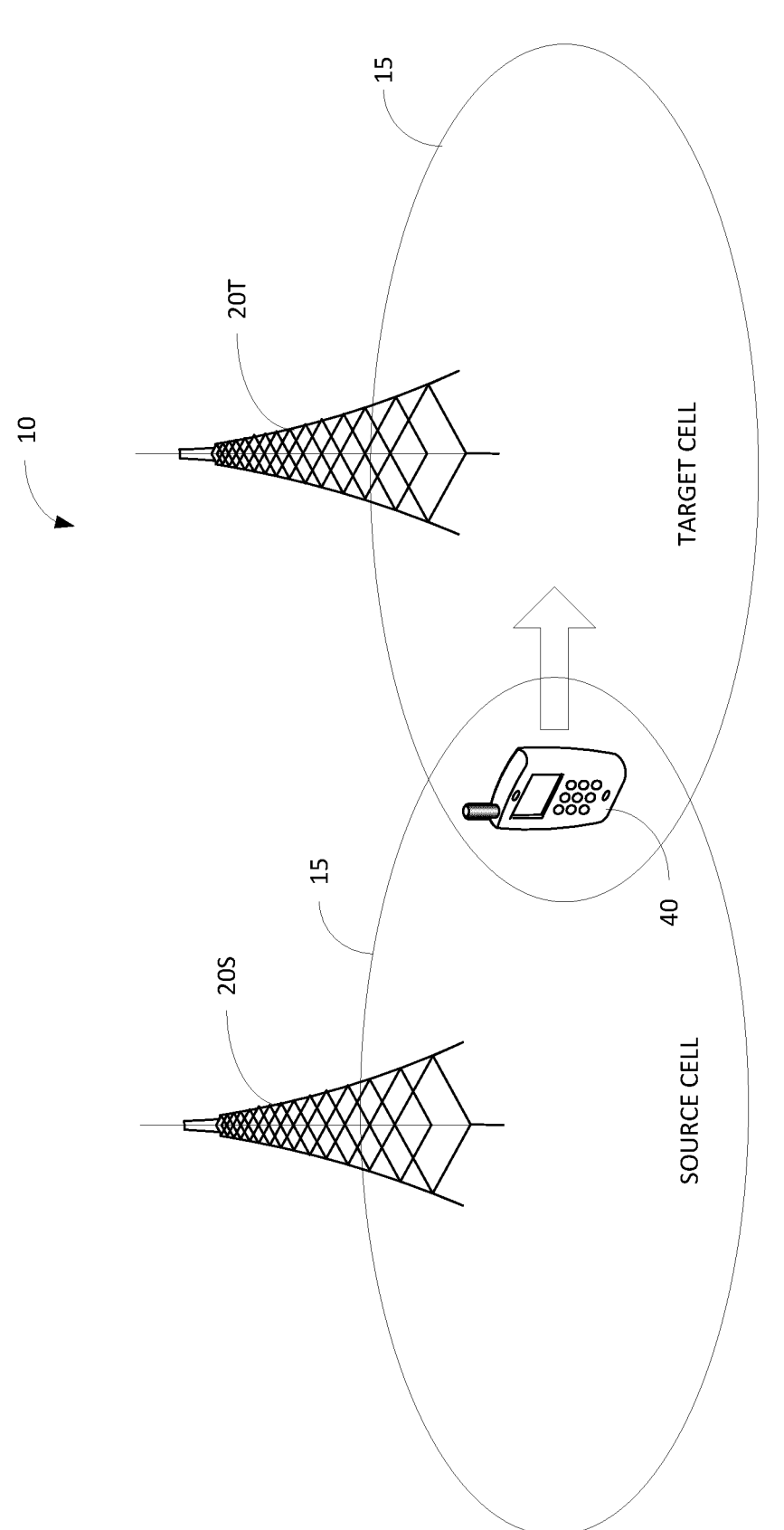
FIG. 1 illustrates an exemplary wireless communication network configured to implement a while handover of a wireless device configured for PDCP packet duplication.

Referring now to the drawings, the present disclosure provides techniques for performing a inter base station handover by a wireless device 40. The techniques enable the wireless device to transition from PDCP packet duplication with the source base station 20S to DAPS to perform an inter base station handover and to transition back to PDCP packet duplication with the target base station 20T. When the wireless device 40 receives the handover command, the wireless device 40 switches from PDCP packet duplication with the source base station 20S to DAPS and performs a DAPS handover. During the DAPS handover, the wireless device 40 continues to receive downlink data transmissions from the source base station 20S until releasing the source base station 20S and continues uplink data transmission to the source base station 20S until successful completion of the RA procedure with the target base station 20T. After the successful RA procedure with the target base station 20T, the wireless device switches back from DAPS to PDCP packet duplication with the target base station 20T.

Exemplary embodiments of the disclosure are described herein in the context of a 5G NR wireless communication network. Those skilled in the art will appreciate that the methods and apparatus herein described are not limited to use in 5G NR networks, but may also be used in Long Term Evolution (LTE) networks and other wireless communication networks that implement PDCP packet duplication.

FIG. 1 illustrates a wireless communication network 10 according to the 5G NR standard. The wireless communication network 10 comprises one or more base stations 20 providing service to wireless devices 40 in respective cells 15 of the wireless communication network 10. The base stations 20 are also referred to as Evolved NodeBs (eNBs) and gNodeBs (gNBs) in 3GPP standards. FIG. 1 illustrates two base stations 20: a source base station 20S and a target base station 20T. The wireless devices 40, also known as user equipment (UE), may comprise any type of equipment capable of communicating with the base station 20 over a wireless communication channel. For example, the wireless devices 40 may comprise cellular telephones, smart phones, laptop computers, notebook computers, tablets, machine-to-machine (M2M) devices (also known as machine type communication (MTC) devices), embedded devices, wireless sensors, or other types of wireless end user devices capable of communicating over wireless communication networks 10.

Figure 2:
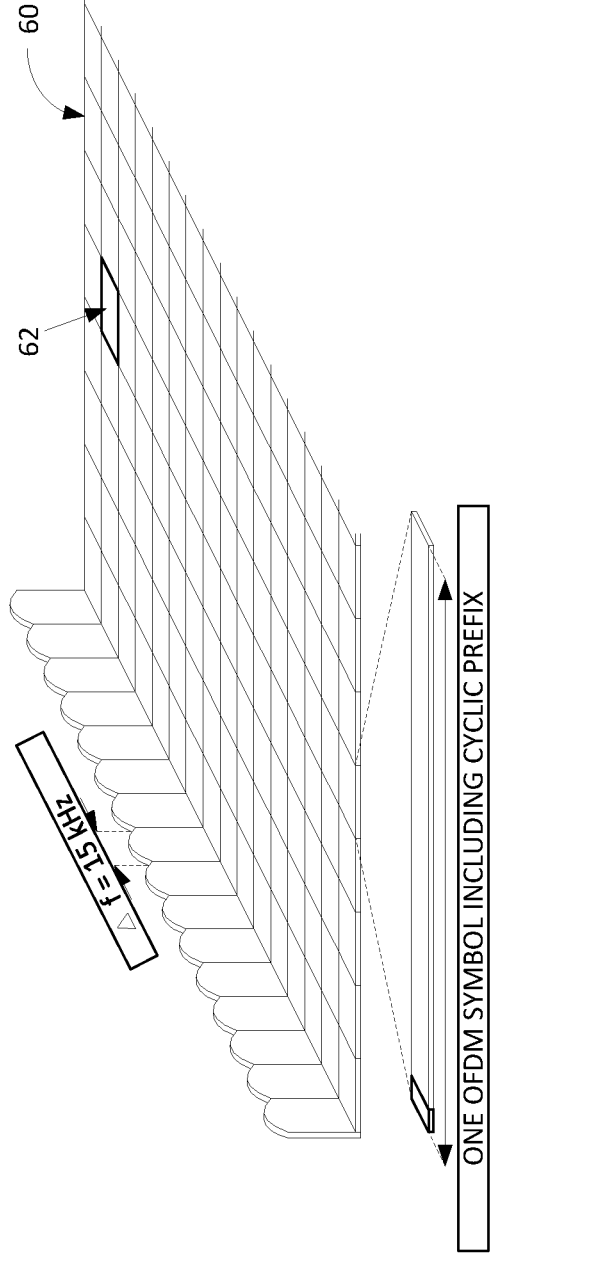
FIG. 2 illustrates a time-frequency grid used in a wireless communication network.

The radio resources in NR can be viewed as a time-frequency grid 60 as shown in FIG. 2. In the time domain, the physical resources are divided into subframes. Each subframe includes a number of symbols. For a normal Cyclic Prefix (CP) length, suitable for use in situations where multipath dispersion is not expected to be extremely severe, a subframe comprises fourteen symbols. A subframe comprises twelve symbols if an extended CP is used. In the frequency domain, the physical resources are divided into subcarriers. The number of subcarriers varies according to the allocated system bandwidth. A subframe typically comprises two time slots, which may be further subdivided into mini-slots. A mini-slot comprises one or more symbol periods in a time slot. The smallest element of the time-frequency grid 60 is a resource element (RE) 62, which comprises the intersection of one subcarrier and one symbol.

Each base station 20 transmits information to the wireless device 40 on DL physical channels. A physical DL channel corresponds to a set of REs carrying information originating from higher layers. The physical DL channels currently defined include the Physical Downlink Shared Channel (PDSCH), the Physical Downlink Control Channel (PDCCH) and the Physical Downlink Broadcast Channel (PBCH). The PDSCH is the main physical channel used for unicast DL data transmission, but also for transmission of random access responses (RARs), certain system information blocks (SIBs), and paging information. The PDCCH is used for transmitting downlink control information (DCI), mainly scheduling decisions required for reception of the PDSCH and UL scheduling grants (SGs) enabling transmission on Physical Uplink Shared Channel (PUSCH). The PBCH carries the basic system information (SI) required by the wireless device 40 to access the network 10.

Each base station 20 is responsible for scheduling DL transmissions to the wireless device 40 on the PDSCH and for allocating resources for the DL transmissions. The base station 20 sends downlink control information (DCI) to the wireless device 40 on the PDCCH to schedule a DL transmission wireless device 40. The DCI includes scheduling information such as the allocated resources for the DL transmission and the modulation and coding scheme (MCS).

The wireless device 40 transmits information to the base station 20 on physical UL channels. A physical UL channel corresponds to a set of REs carrying information originating from higher layers. The physical UL channels currently defined include the Physical Uplink Shared Channel (PUSCH), the Physical Uplink Control Channel (PUCCH) and the Physical Random Access Channel (PRACH). The PUSCH is the UL counterpart to the PDSCH. The PUCCH is used by wireless devices 40 to transmit UL control information (UCI), including Hybrid Automatic Repeat Request (HARQ) acknowledgements, channel state information (CSI) reports, etc. The PRACH is used for random access preamble transmission.

In order to support URLLC, the 5G NR standard implements a feature called PDCP packet duplication as specified in Technical Standard (TS) 38.300 v16.1. When PDCP packet duplication is configured for a radio bearer by Radio Resource Control (RRC), at least one secondary Radio Link Control (RLC) entity in addition to the primary RLC entity is added to the radio bearer to handle the duplicated PDCP packet data units (PDUs). The term "radio bearer" as used herein refers to a bearer between the wireless device 40 and a base station 20 in the radio access network (RAN) for the exchange of user data or control signaling. The logical channel corresponding to the primary RLC entity is referred to as the primary logical channel and the secondary RLC entity is referred to as a secondary logical channel. The wireless device 40 can be configured with multiple secondary RLC entities, each of which supports a logical channel for PDCP packet duplication. When PDCP packet duplication is configured, the same PDCP PDUs are submitted multiple times; once to each activated RLC entity for the radio bearer. By providing multiple independent transmission paths, PDCP packet duplication increases reliability and reduces latency and is especially beneficial for URLLC services.

Figure 3:
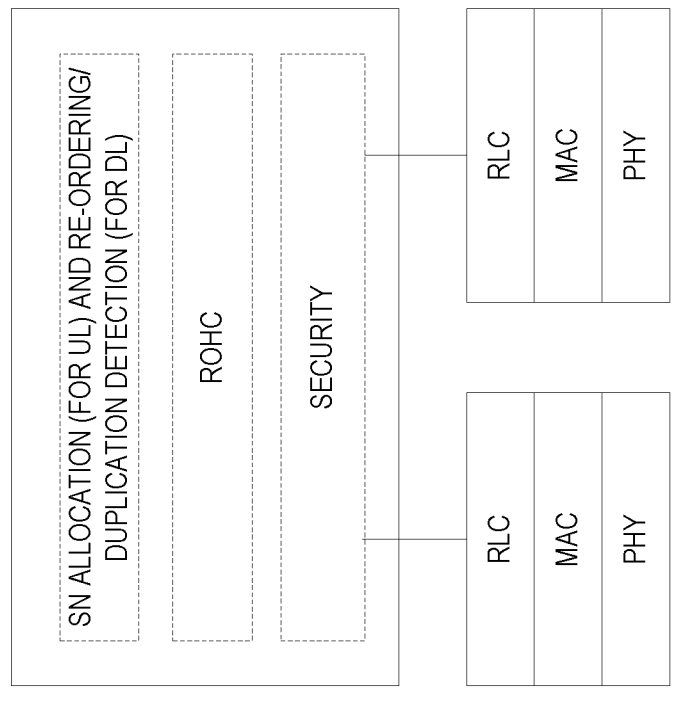
FIG. 3 illustrates protocol stacks for PDCP duplication.

FIG. 3 illustrates protocol stacks of a wireless device 40 configured to implement PDCP packet duplication. The wireless device 40 in this example has two logical connections with the base station 20 and two corresponding protocol stacks; one for each logical connection. The protocol stacks include the Physical (PHY) layer, Medium Access Control (MAC) layer, RLC layer, and PDCP layer. The two protocol stacks associated with the two logical connections each include an RLC entity for the RLC layer. the case of NR, there is an additional protocol layer called Service Data Adaptation Protocol (SDAP) on top of PDCP which is responsible for mapping QoS flows to radio bearers. This layer is not shown in FIG. 3 and is not material to the present disclosure so further discussion of SDAP is omitted for the sake of brevity. Each user plane radio bearer has an associated PDCP entity which in turn has two associated RLC entities—one for the source base station 20S and one for the target base station 20T. When configured for PDCP packet duplication, the same header compression, e.g., Robust Header Compression (ROHC), and security (i.e., integrity protection and ciphering) can be applied to the PDCP packets delivered to or received from both RLC entities. In PDCP packet duplication, there is always only one PDCP entity in total for both protocol stacks. In PDCP packet duplication the PDCP layer may operate with a single instance header compression/ciphering/integrity protection operation.

Even when PDCP packet duplication is employed, there remains a problem of how to meet URLLC Quality of Service (QoS) requirements during an inter base station handover.

Figure 4:
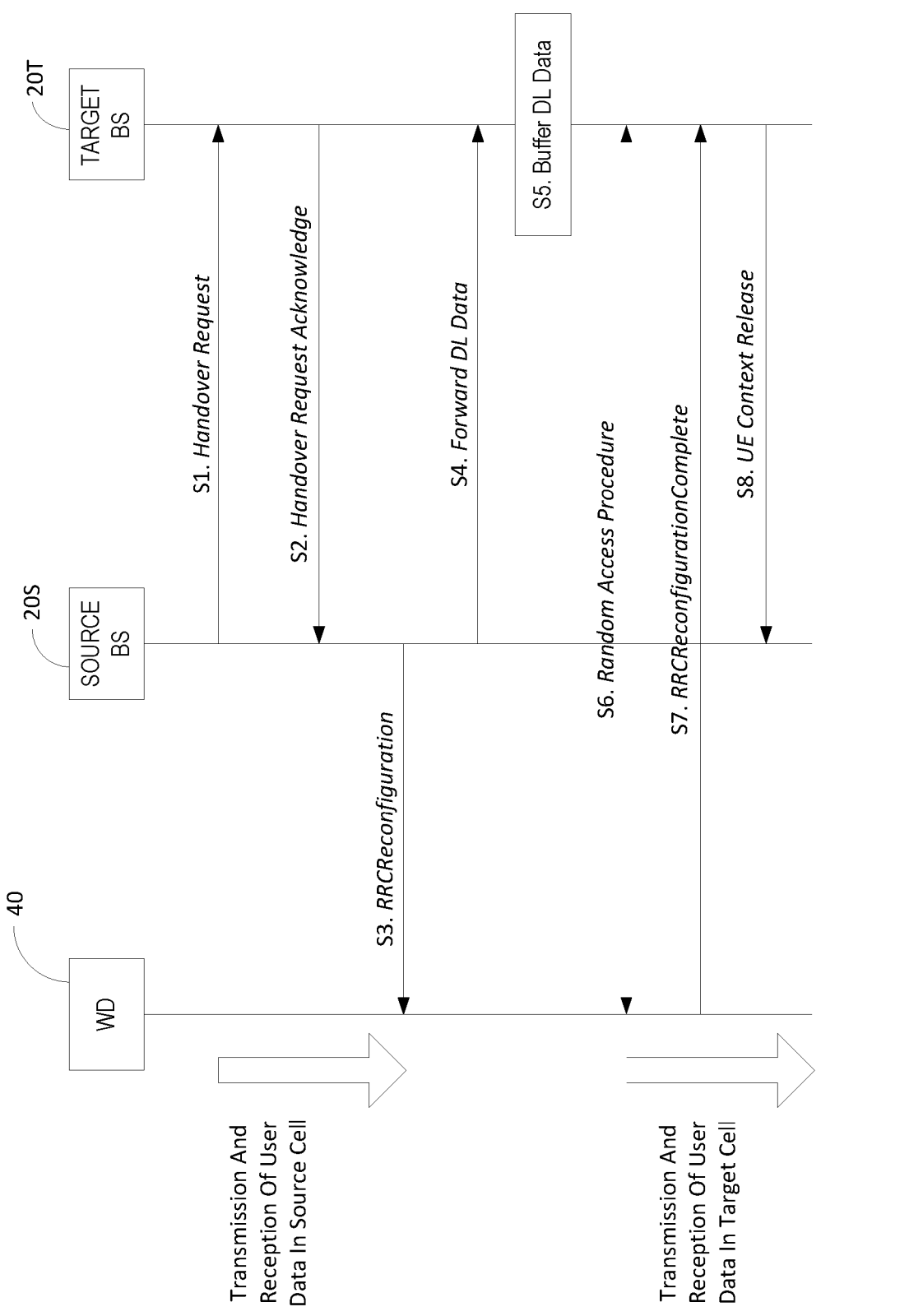
FIG. 4 illustrates an exemplary handover procedure.

FIG. 4 illustrates a conventional inter base station handover. The source base station 20S initiates handover and sends a Handover Request to the target base station 20T over the Xn interface (S1). The target base station 20T performs admission control and provides the new RRC configuration in a Handover Request Acknowledge message (S2). The source base station 20S provides the RRC configuration to the wireless device 40 by forwarding the RRCReconfiguration message received in the Handover Request Acknowledge message (S3). The RRCReconfiguration message includes at least the cell identity (ID) and all information required to access the target base station 20T so that the wireless device 40 can access the target base station 20T without reading system information. For some cases, the information required for contention-based and contention-free random access can be included in the RRCReconfiguration message. The access information to the target base station 20T may include beam specific information, if any.

After sending the RRCReconfiguration message to the wireless device (S3), the source base station 20S may begin forwarding DL data to the target base station 20T while continuing to send DL data to the wireless device (S4). The target base station 20T buffers the DL data until the start of DL data transmission to the wireless device 40 (S5).

Upon receipt of the RRCReconfiguration message, wireless device 40 performs a RA procedure to establish a the RRC connection with the target base station 20T and replies with the RRCReconfigurationComplete message (S6, S7). User data can also be sent if the grant allows. The handover mechanism triggered by RRC requires the wireless device 40 at least to reset the MAC entity and re-establish RLC with the target base station 20T. When the RA procedure is completed, the wireless device 40 sends a RRCReconfigurationComplete message to the target base station 20T (S7).

Upon receipt of the RRCReconfigurationComplete message, the target base station 20T sends a UE context release message to the source base station 20S (S8).

After performing RA procedure with the target base station 20T, wireless device 40 is no longer able to provide a feedback to the source base station 20S which can degrade reliability and require additional signaling, e.g., to provide a sequence number (SN) check. Additionally, there is a risk that the handover will fail resulting in service disruption and further signaling with attendant delays to re-establish a connection to the network. Some of these risks can be mitigated by performing a make-before-break handover, known as Dual Active Protocol Stack (DAPS) handover.

Figure 5:
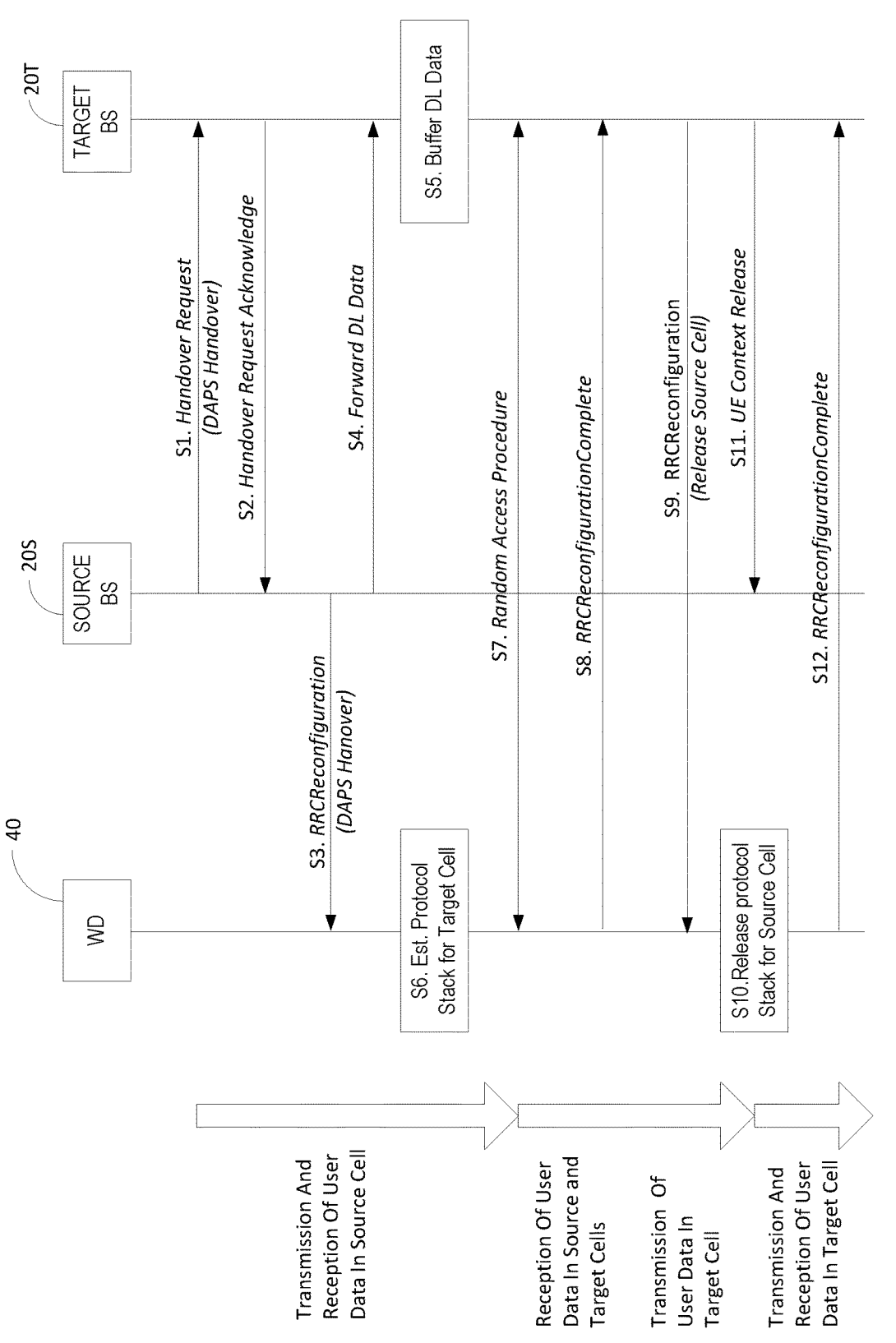
FIG. 5 illustrates an exemplary dual active protocol stack (DAPS) handover procedure.

FIG. 5 illustrates a DAPS handover that enables the wireless device 40 to establish a connection with the target base station 20T before terminating or breaking the connection with the source base station 20S, i.e., a make-before-break handover. In case of DAPS handover, the wireless device 40 continues to receive downlink user transmissions from the source base station 20S and continues the uplink user data transmission to the source base station 20S until successful random access procedure to the target base station 20T. After the successful random access procedure to the target base station 20T, the UE switches the uplink data transmission from source to target base station 20T, while receiving downlink transmission from both the source and target base station 20Ts until the connection with the source base station 20S is released.

As shown in FIG. 5, the source base station 20S initiates handover and sends a Handover Request to the target base station 20T over the Xn interface (S1). The Handover Request includes an indication to perform a DAPS handover. The target base station 20T performs admission control and provides the new RRC configuration in a Handover Request Acknowledge message (S2). The source base station 20S provides the RRC configuration to the wireless device 40 by forwarding the RRCReconfiguration message received in the Handover Request Acknowledge message with an indication to perform a DAPS handover (S3). The RRCReconfiguration message includes at least the cell ID and all information required to access the target base station 20T so that the wireless device 40 can access the target base station 20T without reading system information. For some cases, the information required for contention-based and contention-free random access can be included in the RRCReconfiguration message. The access information to the target base station 20T may include beam specific information, if any.

After sending the RRCReconfiguration message to the wireless device (S3), the source base station 20S may begin forwarding DL data to the target base station 20T while continuing to send DL data to the wireless device (S4). The target base station 20T buffers the DL data until the start of DL data transmission to the wireless device 40 (S5).

Upon receipt of the RRCReconfiguration message, wireless device 40 establishes a protocol stack including a MAC entity and RLC entity for the target base station 20T (S6). A Data Traffic Channel (DTCH) logical channel is associated with the RLC entity for each Data Radio Bearer (DRB) configured with DAPS. For the DRB configured with DAPS, the wireless device 40 reconfigures the PDCP entity with separate security header compression, e.g., ROHC functions for the source and target base station 20TS, and associates them with the RLC entities configured by the source and target respectively.

When the protocol stack and logical channels for the target base station 20T have been configured, the wireless device 40 performs a RA procedure to establish a connection with the target base station 20T (S7). When the RA procedure is completed, the wireless devices 40 sends a RRCReconfigurationComplete message to the target base station 20T (S8). The wireless device 40 now receives DL data from both the source and target base stations 20S and 20T and transmits UL data to the target base station 20T. Upon receipt of the RRCReconfigurationComplete message, the target base station 20T sends a RRCReconfiguration message to the wireless device requesting release of the source base station 20S (S9). At the same time, the target base station 20T sends a UE context release message to the source base station 20S (S10). In response to the RRCReconfiguration message with the release request, the wireless device 40 releases the source protocol stack (S11) and replies with a RRCReconfigurationComplete message. The wireless device 40 receives DL data from and transmits UL data to the target base station 20T.

Note that the handling of RLC and PDCP for DRBs without DAPS is same as in normal handover.

Figure 6:
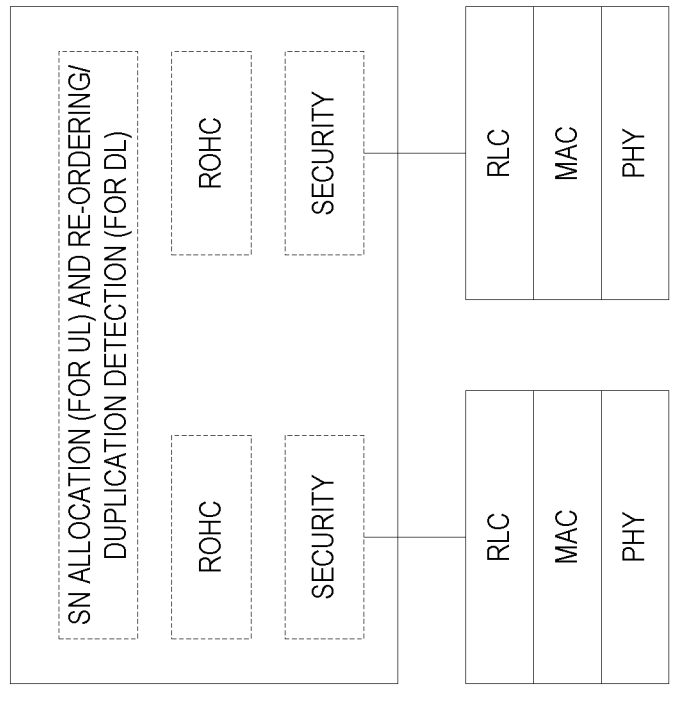
FIG. 6 illustrates protocol stacks for a DAPS handover.

FIG. 6 illustrates protocol stacks of a wireless device 40 configured for DAPS. Each user plane radio bearer has an associated PDCP entity which in turn has two associated RLC entities—one for the source base station 20S and one for the target base station 20T. The PDCP entity uses different security keys and ROHC contexts for the source and target base station 20T while the sequence number (SN) allocation (for UL transmission) and re-ordering/duplication detection (for DL reception) is common. As such, in DAPS, the UE may operate a PDCP layer with multiple instances of PDCP entity, e.g. multiple instances of header compression/ciphering/integrity protection operation.

RRC managed handovers with and without PDCP entity re-establishment are both supported. For DRBs using RLC Acknowledged Mode (AM) mode, PDCP can either be re-established together with a security key change or initiate a data recovery procedure without a key change. For DRBs using RLC Unacknowledged Mode (UM) mode and for Signaling Radio Bearers (SRBs), PDCP can either be re-established together with a security key change or remain as it is without a key change.

Data forwarding, in-sequence delivery and duplication avoidance at handover can be guaranteed when the target base station 20T uses the same DRB configuration as the source base station 20S.

Timer based handover failure procedure is supported in NR. RRC connection re-establishment procedure is used for recovering from handover failure except in certain conditional handover (CHO) or DAPS handovers: When a DAPS handover fails, the wireless device 40 reports DAPS handover failure via the source base station 20S without triggering RRC connection re-establishment if the source link has not been released. When initial CHO execution attempt fails or handover fails, the wireless device 40 performs cell selection, and if the selected cell is a CHO candidate and if network configured the UE to try CHO after HO/CHO failure, then the wireless device 40 attempts CHO execution once, otherwise re-establishment is performed.

DAPS handover for FR2 to FR2 case is not supported in the current release of the specification but may be supported in future releases.

One difficulty with the current DAPS handover is how to maintain URLLC QoS requirements during the handover. URLLC features like PDCP duplication currently are not supported in combination with DAPS. Moreover, in some cases after performing random access (RA) with the target base station 20T, UE is no longer able to provide a feedback to the source base station 20S which can degrade reliability and require additional signaling (sequence number (SN) check).

One aspect of the disclosure comprises methods for transitioning from PDCP duplication source base station 20S to perform a DAPS handover and transitioning from DAPS to PDCP packet duplication with the target base station 20T when the handover is complete. The techniques ensure that URLLC QoS/reliability requirements can be met during handover. The techniques can be applied, for example, to networks supporting multi-carrier operation, such as carrier aggregation (CA) and dual carrier (DC) configurations.

In CA, the wireless device 40 is configured with a primary component carrier (PCC) and one or more secondary component carriers (SCCs). The primary component carrier is referred to as a primary cell (PCell) and the secondary component carriers are referred to as Secondary cells (SCells). For PDCP packet duplication, the wireless device 40 configures a separate RLC entity for each component carrier.

Figure 7:
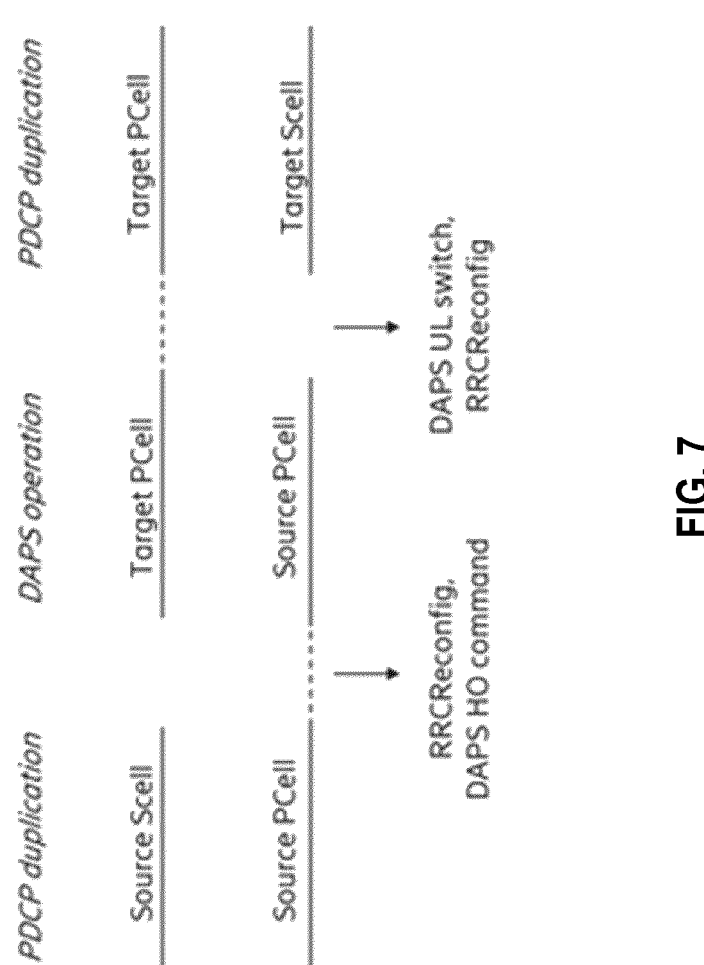
FIG. 7 illustrates a handover procedure for a wireless device configured for PDCP packet duplication.

FIG. 7 illustrates the transition from PDCP packet duplication in a source base station 20S to DAPS for a handover and back to PDCP packet duplication with the target base station 20T for a wireless device configured with a PCell and one SCell. Thus, the present disclosure provides for communication with the source base station and target base stations using PDCP packet duplication. A transition phase, during handover, uses DAPS. This allows efficient handover of multiple cells (e.g. a PCell and SCell). The techniques herein described are also applicable to the case where the wireless device 40 is configured with multiple SCells, and in case of dual connectivity, where the master cell group (MCG) and secondary cell group (SCG) are considered instead of PCell and SCell.

In the example shown in FIG. 7, the wireless device 40 has a first logical channel associated with the PCell and a second logical channel associated with the SCell. A corresponding RLC entity is established for each logical channel for PDCP packet duplication. For each PDCP packet transmitted over the first logical channel in the PCell, a duplicate PDCP packet is also transmitted via the second logical channel in the SCell.

For the transition to the DAPS operation phase, the wireless device 40 is reconfigured, e.g. via RRC and/or, in the same or separate step receives the DAPS handover command instructing the wireless device 40 to switch to DAPS operation. During the handover, the wireless device 40 maintains connection to one of the component carriers with the source base station 20S while the other reconfigured to switch to a component carrier with the target base station 20T. In the example shown in FIG. 7, the logical channel associated with the source PCell is maintained while the logical channel associated with the source SCell is moved to a PCell in the target base station 20T. In this step the same associated RLC entities can be maintained so that no new RLC entity needs to be established. In this step, the UE has two logical connections using DAPS, e.g. as a PCell with the target base station and a PCell with the source base station. This approach has the advantage that RLC transmission can be maintained, leading to fewer interruptions. Switching the RLC entity can be achieved by reconfiguration of the logical channel transmission (LCH) restrictions, i.e. from source SCell to target PCell. Alternatively, the RLC entity of the source SCell can be released, and a new RLC entity established for the target PCell. In this case, PDCP data recovery/re-establishment/retransmission of UL PDCP PDUs may be triggered to retransmit the data lost (not yet acknowledged PDCP data) in the released RLC entity to the new RLC entity. PDCP may in this step switch operation for header compression, ciphering and/or integrity protection from one-instance operation to two-instance operation (as in DAPS) while maintaining the associated RLC entities.

In the DAPS phase of operation, the wireless device 40 may optionally be configured to transmit duplicates in PDCP UL in order to achieve high reliability. The configuration may be used continuously in this phase, instead of or in addition to retransmission of unacknowledged PDCP data after the handover. When configured to transmit PDCP UL duplicates, the wireless device 40 provides duplicate PDCP data to each first and secondary logical connections for transmission to source and target base station, respectively.

When the UL switch in DAPS is triggered, e.g. by RRC command, the transition from DAPS to PDCP duplication operation with the target base station 20T is initiated. For example, during this step, RRC configuration in the same RRC command or a separate RRC command is received. The wireless device 40 can maintain the associated RLC entities as previously described by reconfiguration of the logical channel (LCH) transmission restrictions of the logical channels associated with the RLC entities. In this example, the wireless device 40 keeps the target PCell as a PCell and switches (remove/add) the logical channel associated with the source PCell to a target SCell. In this step the logical channel transmission restrictions associated with the logical channel of the RLC entity transmitting only to the source PCell are changed to allow transmission to the target SCell only. Alternatively, the RLC entity previously associated with source PCell is released and new RLC entity associated with target SCell is established, for which case PDCP would trigger retransmissions with PDCP data recovery/reestablishment/UL switch operation to avoid data loss of the released RLC entity, i.e., retransmit now yet acknowledged PDCP data from the released RLC entity in the new established RLC entity. PDCP may switch from multi instance header compression/ciphering/integrity protection operation to single instance operation.

In the last phase, i.e. when the handover is completed to the target base station, the wireless device 40 operates in PDCP duplication operation with a target PCell and a target SCell.

Figure 8:
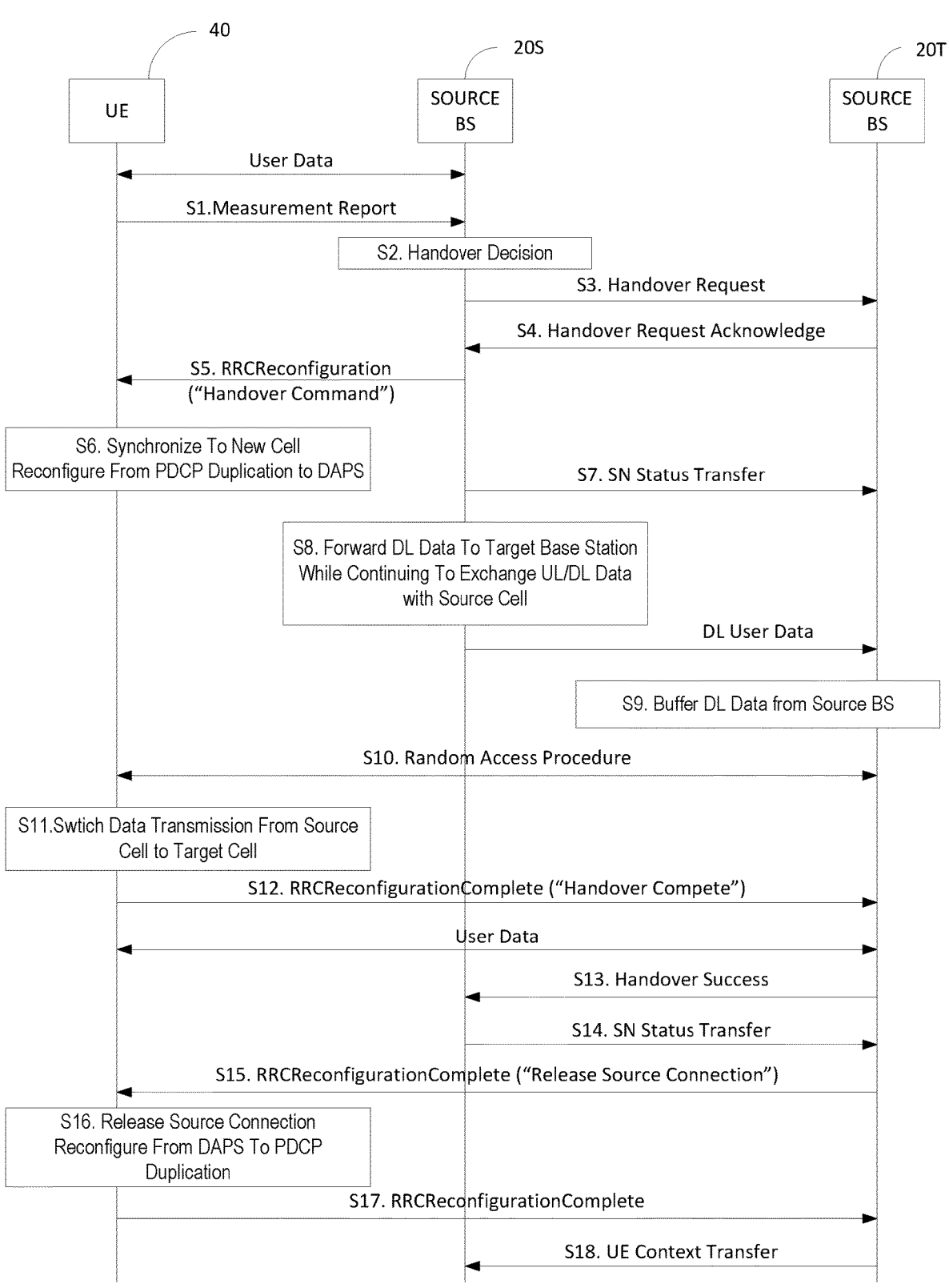
FIG. 8 illustrates an exemplary handover procedure for a wireless device configured for PDCP packet duplication.

FIG. 8 illustrates an exemplary handover procedure implemented by a wireless device 40 configured for PDCP packet duplication. The wireless device 40 and source base station 20S have an established connection and are exchanging user data. Due to some trigger, e.g., a measurement report from the wireless device 40 (S1), the source base station 20S decides to handover the wireless device 40 to the target base station 20T (S2). The source base station 20S initiates handover and sends a Handover Request to the target base station 20T over the Xn interface (S3). The target base station 20T performs admission control and provides the new RRC configuration in a Handover Request Acknowledge message (S4). The source base station 20S provides the RRC configuration to the wireless device 40 by forwarding the RRCReconfiguration message received in the Handover Request Acknowledge message (S5). The RRCReconfiguration message includes an indication to perform a DAPS handover.

Upon reception of the handover command with indication of a DAPS handover, the wireless device 40 starts synchronizing to the target base station 20T and reconfigures from PDCP packet duplication to DAPS (S6). For the bearers configured for DAPS, unlike in normal handover, the wireless device 40 keeps the connection with the source base station 20S and continues to exchange UL/DL data with the source base station 20S even after it has received the handover command. For the radio bearers configured for DAPS, the wireless device 40 reconfigures from PDCP duplication to DAPS. In order to decrypt/encrypt DL/UL data, the wireless device 40 needs to maintain both the source and target security keys until the source base station 20S is released. The wireless device 40 can differentiate the security key to be used based on the cell which the DL/UL packet is received/transmitted on. If header compression is used the wireless device 40 also needs to maintain two separate ROHC contexts for the source and target base station 20T.

The source base station 20S sends a SN Status Transfer message to the target base station 20T and begins to forward DL data to the target base station 20T (S7,S8). Data being forwarded may also be sent to the wireless device 40 by the source base station 20S, i.e., DL data may be duplicated. The target base station 20T buffers the DL data until the wireless device 40 has connected with the target base station 20T (S9). The Xn message for conveying the DL and (possibly) UL receiver status for early data transfer in the DAPS handover could either re-use the existing SN Status Transfer message (as indicated in the figure) or a new Early Forwarding Transfer message could be defined.

The wireless device 40 performs a RA procedure with the target base station 20T to establish a connection with the target base station 20T. (S10). Once the wireless device 40 has completed the random access with the target base station 20T, it switches the transmission of new and unacknowledged UL data PDCP Signaling Data Units (SDUs), for the bearers configured for DAPS, to the target base station 20T (S11). After this point, the wireless device 40 receives DL data from both source and target base station 20T while UL data is sent only to the target base station 20T. The wireless device 40 sends the handover complete (a RRCReconfigurationComplete message) to the target base station 20T (S12).

In response to the handover complete message, the target base station 20T sends a Handover Success message to the source base station 20S indicating the wireless device 40 has successfully established the target connection (S13). Upon reception of the Handover Success message, the source base station 20S stops scheduling any further DL or UL data to the wireless device 40 and sends a final SN Status Transfer message to target base station 20T indicating the latest PDCP SN and hyperframe number (HFN) transmitter and receiver status (S14).

The target base station 20T instructs the wireless device 40 to release the source connection by sending an RRCReconfiguration message with "release source" indication (S15). The wireless device 40 releases the source connection, reconfigures the bearers configured for DAPS into PDCP duplication and responds with a RRCReconfigurationComplete message (S16, 317). From this point on, DL and UL data is only received and transmitted with the target base station 20T. Upon receiving the handover complete message, the target base station 20T can start exchanging user data with the wireless device 40. The target base station 20T also requests the Access and Mobility Management Function (AMF) to switch the DL data path from the User Plane Function (UPF) from the source base station 20S to the target base station 20T (not shown). Once the path switch is completed the target node sends the UE Context Release message to the source node (S18).

In some embodiments, instead of carrier aggregation with PCell and SCell, the techniques can be employed with multi-transmission point (TRP) operation, where the wireless device 40 capability to receive/transmit via different transmission points rather than different carriers is employed. It is assumed that PDCP duplication operation can be used to transmit duplicates via those two TRPs in this case.

In some embodiments, the network may control for which bearers the wireless device 40 shall perform transition from PDCP duplication into DAPS and then back to PDCP duplication. In one alternative, if a certain bearer is configured for PDCP duplication when the wireless device 40 receives the handover command which configures this particular bearer for DAPS, the wireless device 40 always performs this transition. In another alternative, an explicit indication is used in the handover command, possibly on per-bearer basis, whether the wireless device 40 shall perform the transition or not. In this alternative, if the network indicates that the wireless device 40 shall not perform the transition, the wireless device 40 stops PDCP duplication for at reception of the handover command and does not resume the PDCP duplication after the source base station 20S is released. In yet another alternative, the network indicates whether the wireless device 40 shall perform a transition to PDCP duplication when releasing the source base station 20S, using the same RRCReconfiguration message that contains the indication to release the source base station 20S.

In another embodiment, the network indicates in the handover command that the wireless device 40 shall preserve one of the RLC entities used for PDCP duplication and associate this RLC entity instead with the target base station 20T when DAPS is configured. In this embodiment, the wireless device 40 also preserves the RLC entity after the source base station 20S is released and associate it with a certain target SCell which is also added in the same RRCReconfiguration message that contains the indication to release the source base station 20S.

FIG. 9 illustrates an exemplary handover method 100 implemented by a wireless device 40. The wireless device 40 is assumed to be configured with first and second logical connections for packet duplication with a source base station 20S. The method comprises receiving a handover command from a source base station 20S while the wireless device 40 is configured to perform packet duplication wherein the wireless device 40 exchanges duplicate packets with the source base station 20S using the first and second logical connections (block 110). Responsive to the handover command, the wireless device 40 configures dual active protocol stacks with the source base station 20S and target base station 20T and moves the second logical connection to the target base station 20T while maintaining the first logical connection to the source base station (block 120). The wireless device 40 receives a release command from the target base station 20T (block 130). Responsive to the release command, the wireless device 40 configures packet duplication with the target base station 20T and moves the first logical connection to the target base station 20T (block 140).

In some embodiments of the method 100, the handover command includes an indication to perform a DAPS handover.

In some embodiments of the method 100, the indication applies to a specific radio bearer.

Some embodiments of the method 100 further comprise exchanging uplink and downlink data with the source base station 20S while the second logical connection is being moved, terminating uplink transmission to the source base station after the second logical connection has been moved to the target base station 20T while continuing to receive downlink data and terminating reception of downlink data from the source base station after the first logical connection has been moved to the target base station 20T.

In some embodiments of the method 100, the first and second logical connections are moved to the first base station without releasing corresponding radio link control (RLC) entities for the first and second logical connections.

In some embodiments of the method 100, moving the second logical connection to the first target base station comprises reconfiguring logical channel transmission restrictions to associate the RLC entity for the second logical connection with the target base station 20T and moving the first logical connection to the target base station 20T comprises reconfiguring logical channel transmission restrictions to associate the RLC entity for the first logical connection with the target base station 20T.

In some embodiments of the method 100, moving the first and second logical connections to a target base station comprises releasing corresponding RLC entities for the first and second logical connections associated with the source base station 20S, and establishing a new RLC entities for the first and second logical connections associated with the target base station 20T.

Some embodiments of the method 100 further comprise receiving first configuration information from the source base station 20S for configuring dual protocol stacks for the handover.

In some embodiments of the method 100, at least a part of the first configuration information is received with the handover command in a radio resource control (RRC) message.

In some embodiments of the method 100, at least a part of the first configuration information is received in a RRC message separate from the RRC message carrying the handover command. In some embodiments of the method 100, moving the second logical connection to the target base station 20T comprises applying separate header compression and security contexts to first and second logical connection, i.e., by changing to applying header compression and security contexts to the second logical connection from contexts of the source base station to contexts of the target base station 20T. Additionally, moving the first logical connection to the target base station 20T may comprises applying common header compression and security contexts to first and second logical connection, i.e. by changing header compression and security contexts applied to the first logical connection from contexts of the source base station to contexts of the target base station 20T.

Some embodiments of the method 100 further comprise receiving second configuration information from the target base station 20T for configuring packet duplication with the target base station 20T.

In some embodiments of the method 100, at least a part of the second configuration information is received with the release command in a RRC message.

In some embodiments of the method 100, at least a part of the second configuration information is received in a RRC message separate from the RRC message carrying the release command.

In some embodiments of the method 100, the first and second logical connections are associated with first and second cells respectively with the source base station and are moved to first and second cells respectively with the target base station 20T.

In some embodiments of the method 100, the first and second logical connections are associated with first and second transmission points respectively with the source base station 20S.

FIG. 10 illustrates an exemplary handover method 200 implemented by a source base station 20S. The source base station 20S determines a need to handover a wireless device 40 (block 210). The source base station 20S sends a handover command to the wireless device 40 to initiate handover to the target base station 20T while the wireless device 40 is configured for packet duplication wherein the wireless device 40 exchanges duplicate packets with the source base station 20S using first and second logical connections (block 220). The source base station 20S maintains the first logical connection with the wireless device 40 while the wireless device 40 moves the second logical connection to a target base station 20T (block 230). The source base station 20S receives a handover message from the target base station 20T indicating successful handover (block 240). Responsive to the handover message, the base station 20S releases the first logical connection with the wireless device 40 (block 250).

In some embodiments of the method 200, handover command includes an indication to perform a dual active protocol stack (DAPS) handover.

In some embodiments of the method 200, the indication applies to a specific radio bearer.

Some embodiments of the method 200 further comprise, forwarding downlink packets to the target base station.

Some embodiments of the method 200 further comprise sending configuration information to the wireless device to configure dual protocol stacks for the handover.

In some embodiments of the method 200, at least a part of the configuration information is received with the handover command in a radio resource control message.

In some embodiments of the method 200, at least a part of the configuration information is received in a radio resource control message separate from the handover command.

In some embodiments of the method 200, the first and second logical connections are associated with first and second cells respectively of the source base station 20S and are moved to first and second cells respectively of the target base station 20T.

In some embodiments of the method 200, the first and second logical connections are associated with first and second source transmission points respectively for the source base station 20S.

FIG. 11 illustrates an exemplary handover method 300 implemented by a target base station 20T. The target base station 20T receives a handover request message from the source base station 20S serving a wireless device 40 configured to perform packet duplication wherein the wireless device exchanges duplicate packets with the source base station using first and second logical connections (block 310). Responsive to the handover request message, the target base station 20T establishes the second logical connection with the wireless device 40 while the wireless device 40 continues to exchange data with the source base station 20S using the first logical connection (block 320). The target base station 20T sends a release command to the wireless device 40 (block 330). The release command includes an indication to configure packet duplication for communication with the target base station 20T wherein the wireless device 40 exchanges duplicate packets with the target base station 20T using the first and second logical connections. The target base station 20T establishes the first logical connection with the wireless device 40 while maintaining the second logical connection to configure the target base station 20T for packet duplication (block 340).

In some embodiments of the method 300, the indication applies to a specific radio bearer.

Some embodiments of the method 300 further comprise sending configuration information to the wireless device to configure the packet duplication with the target base station 20T.

In some embodiments of the method 300, at least a part of the configuration information is received with the release command in a radio resource control message.

In some embodiments of the method 300, at least a part of the configuration information is received in a radio resource control message separate from the release command.

In some embodiments of the method 300, the first and second logical connections are associated with first and second source cells respectively of the source base station 20S and are moved to first and second cells of the target base station 20T.

In some embodiments of the method 300, the first and second logical connections are associated with first and second source transmission points respectively of the source base station 20S.

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 12:
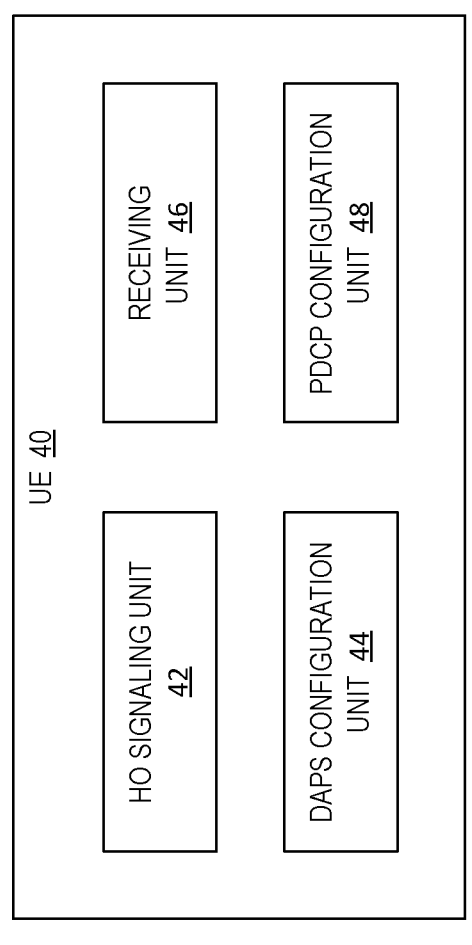
FIG. 12 illustrates a wireless device configured to implement an inter base station handover.

FIG. 12 illustrates a wireless device 40 in accordance with one or more embodiments. The wireless device 40 comprises a handover signaling unit 42, a DAPS configuration unit 44, a receiving unit 46 and a PDCP configuration unit 48. The various units 42-48 can be implemented by hardware and/or by software code that is executed by one or more processors or processing circuits. The handover unit 42 is configured to receive a handover command from a source base station 20S while the wireless device 40 is operating in a packet duplication in which the wireless device 40 exchanges duplicate packets with the source base station 20S using the first and second logical connections. The DAPS configuration unit 44, is configured to, responsive to the handover command, configure DAPS with the source base station 20S and target base station 20T respectively and move the second logical connection to a target base station 20T while maintaining the first logical connection to the source base station 20S. The receiving unit 46 is configured to, receive a release command from the target base station 20T after the first and second logical connections have been moved. The PDCP configuration unit 48 configures the wireless device 40 for the packet duplication with the target base station 20T and moves the first logical connection to the target base station 20T.

Figure 13:
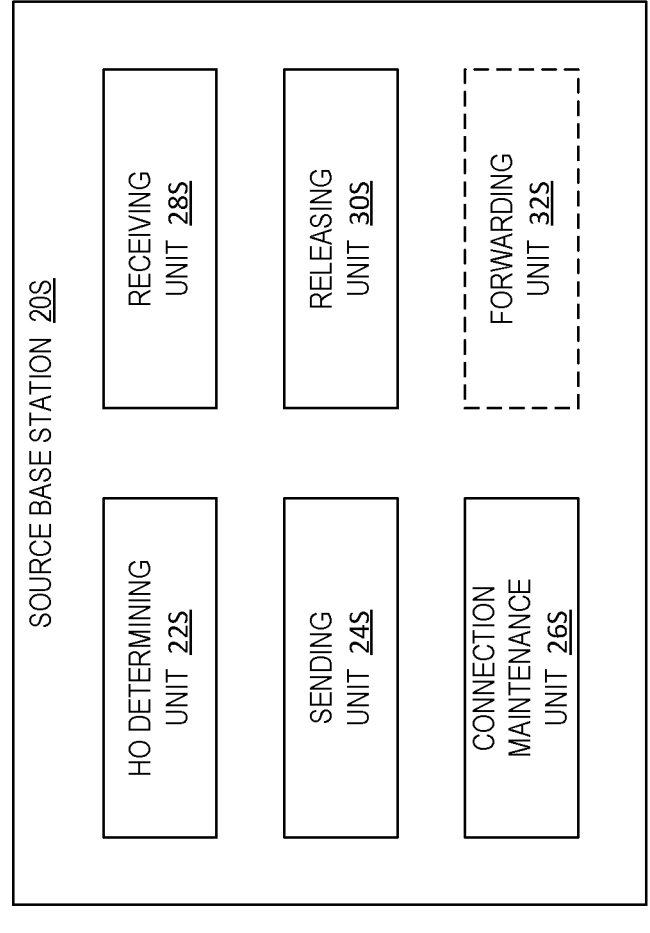
FIG. 13 illustrates a source base station configured to handover a wireless device configured for PDCP packet duplication.

FIG. 13 illustrates a source base station 20S in accordance with one or more embodiments. The source base station 20S comprises a handover determining unit 22S, a sending unit 24S, a connection maintenance unit 26S, a receiving unit 28S, a releasing unit 30S and an optional forwarding unit 32S. The various units 22S-32S can be implemented by hardware and/or by software code that is executed by one or more processors or processing circuits. The handover determining unit 22S is configured to determine a need to handover a wireless device 40. The sending unit 24S, is configured to send a handover command to the wireless device 40 to initiate handover to the target base station 20T while the wireless device 40 is configured for packet duplication wherein the wireless device 40 exchanges duplicate packets with the source base station 20S using first and second logical connections. The connection maintenance unit 26S is configured to maintain the first logical connection with the wireless device 40 while the wireless device 40 moves the second logical connection to a target base station 20T. The receiving unit 28S is configured to receive a handover message from the target base station 20T indicating successful handover. The second releasing unit 30S is configured to release the first logical connection with the wireless device 20 responsive to the handover message. The forwarding unit 32S, when present, is configured to forward DL packets to the target base station 20T while maintaining the first logical connection with the wireless device 40.

Figure 14:
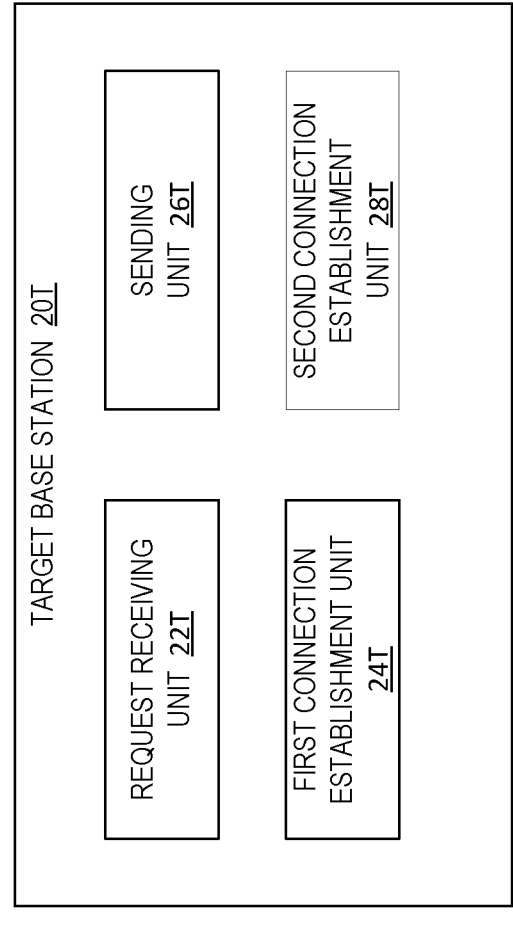
FIG. 14 illustrates a target base station configured to handover a wireless device configured for PDCP packet duplication.

FIG. 14 illustrates a target base station 20T in accordance with one or more embodiments. The source target node 20T comprises a request receiving unit 22T, a first connection establishment unit 24T, a sending unit 26T, and a second connection establishment unit 28T. The various units 22T-28T can be implemented by hardware and/or by software code that is executed by one or more processors or processing circuits. The request receiving unit 22S is configured to receive a handover request message from the source base station 20S. The first connection establishment unit 24T is configured to, responsive to the handover request message, establish the second logical connection with the wireless device 40 while the wireless device 40 continues to exchange data with the source base station 20S using the first logical connection. The sending unit 26T is configured to send a release command to the wireless device 40. The release command includes an indication to configure packet duplication for communication with the target base station 20T wherein the wireless device 40 exchanges duplicate packets with the target base station 20T using the first and second logical connections. The second connection establishment unit 28T is configured to establish the first logical connection with the wireless device 40 while maintaining the second logical connection to configure the target base station 20T for packet duplication. Alternatively to use of a release command, examples may include the UE operating without receiving a release command, e.g. using a timer or a determination made without a release command.

Figure 15:
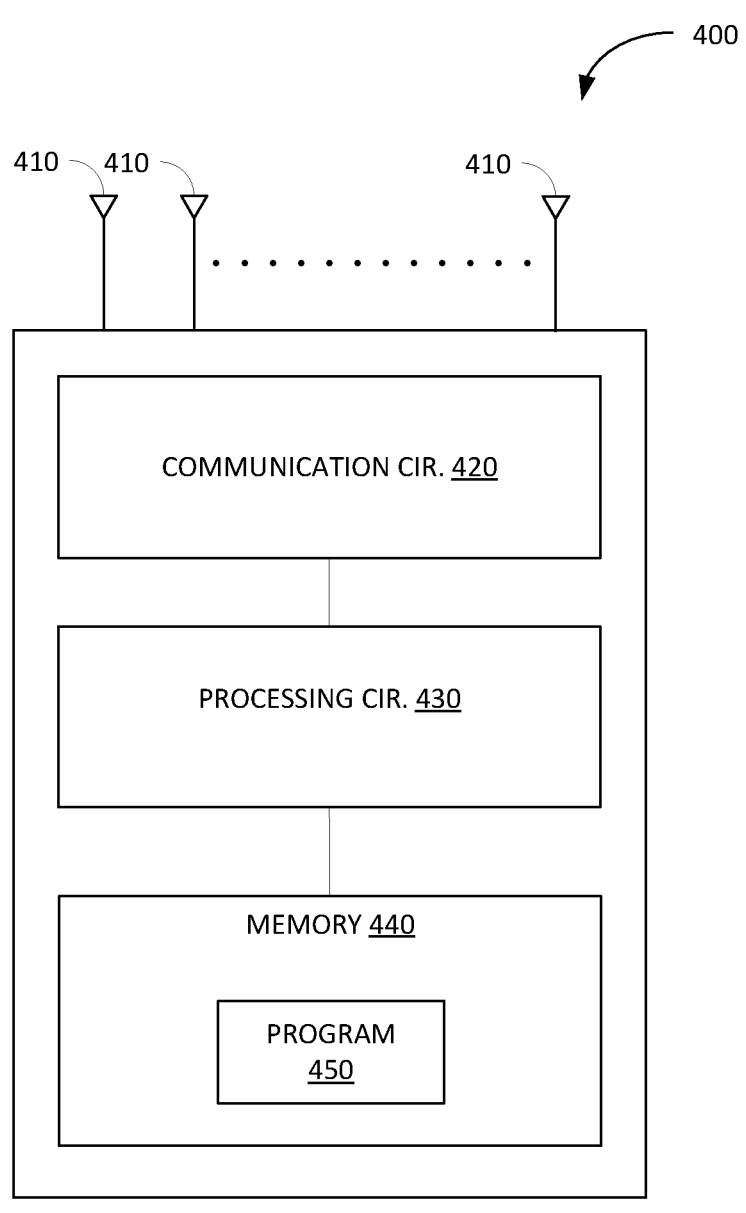
FIG. 15 illustrates a wireless device configured to handover a wireless device configured for PDCP packet duplication.

FIG. 15 illustrates an exemplary wireless device 400 according to one embodiment. The wireless device 40 comprises a plurality of antennas 410, communication circuitry 420, processing circuitry 430, and memory 440.

The communication circuitry 420 is coupled to the antennas 410 and comprises the radio frequency (RF) circuitry needed for transmitting and receiving signals over a wireless communication channel. In one exemplary embodiment, the communication circuitry 420 comprise a transmitter and receiver configured to operate according to the NR standard.

The processing circuitry 430 controls the overall operation of the wireless device 400 and processes the signals transmitted to or received by the wireless device 400. The processing circuitry 430 may comprise one or more microprocessors, hardware, firmware, or a combination thereof. In one embodiment, the processing circuitry 430 is configured to implement the method 100 shown in FIG. 9.

Memory 440 comprises both volatile and non-volatile memory for storing computer program code and data needed by the processing circuitry 430 for operation. Memory 440 may comprise any tangible, non-transitory computer-readable storage medium for storing data including electronic, magnetic, optical, electromagnetic, or semiconductor data storage. Memory 440 stores a computer program 450 comprising executable instructions that configure the processing circuitry 430 to implement the method 100 according to FIG. 9 as described herein. A computer program 450 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 450 for configuring the processing circuitry 430 as herein described may be stored in a removable memory, such as a portable compact disc, portable digital video disc, or other removable media. The computer program 450 may also be embodied in a carrier such as an electronic signal, optical signal, radio signal, or computer readable storage medium.

Figure 16:
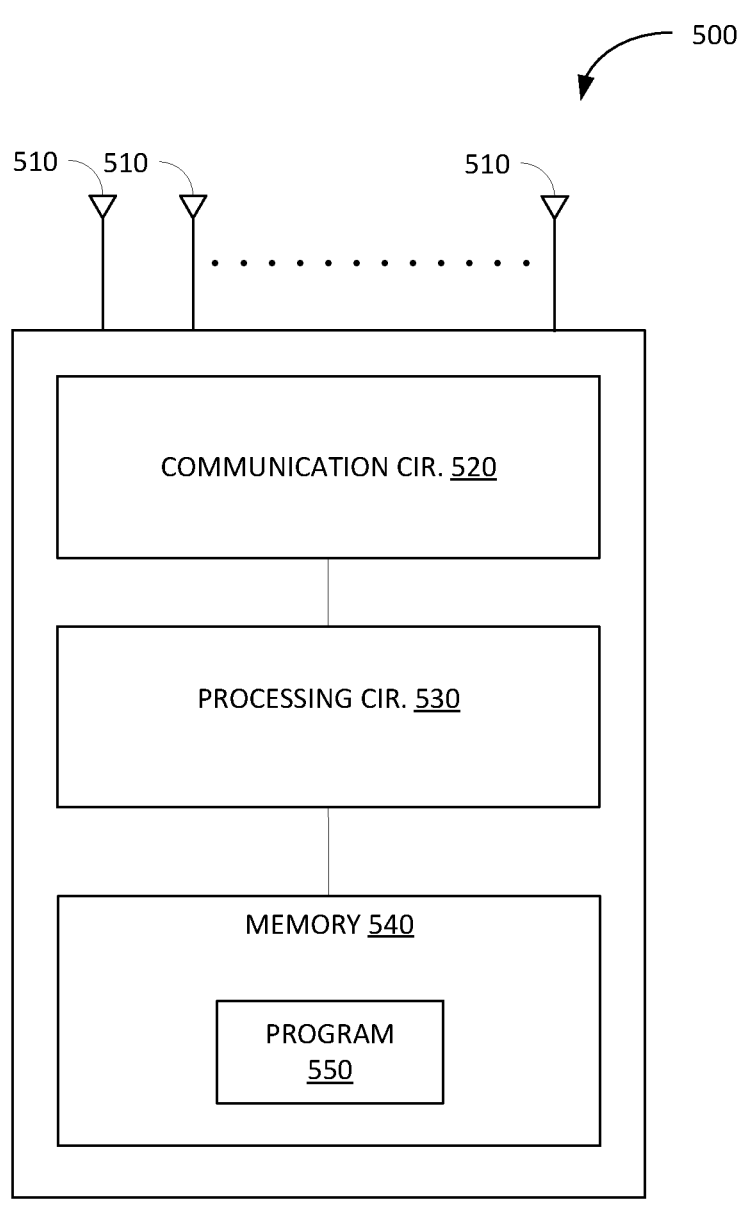
FIG. 16 illustrates a source/target base station configured to handover a wireless device configured for PDCP packet duplication.

FIG. 16 illustrates an exemplary base station 500 according to one embodiment that may be configured to function as a source base station 20S or target base station 20T as herein described. The base station 500 comprises a plurality of antennas 510, communication circuitry 520, a processing circuitry 530, and memory 540.

The communication circuitry 520 is coupled to the antennas 510 and comprises the radio frequency (RF) circuitry needed for transmitting and receiving signals over a wireless communication channel. In one exemplary embodiment, the communication circuitry 520 comprise a transmitter and receiver configured to operate according to the NR standard.

The processing circuitry 530 controls the overall operation of the base station 500 and processes the signals transmitted to or received by the base station 500. The processing circuitry 530 may comprise one or more microprocessors, hardware, firmware, or a combination thereof. In one embodiment, the processing circuitry 530 is configured to implement one or more of the methods 200, 300 shown in FIGS. 10 and 11 respectively.

Memory 540 comprises both volatile and non-volatile memory for storing computer program code and data needed by the processing circuitry 530 for operation. Memory 540 may comprise any tangible, non-transitory computer-readable storage medium for storing data including electronic, magnetic, optical, electromagnetic, or semiconductor data storage. Memory 540 stores a computer program 550 comprising executable instructions that configure the processing circuitry 530 to implement one or more of the methods 200, 300) according to FIGS. 10 and 11 respectively. A computer program 550 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 550 for configuring the processing circuitry 530 as herein described may be stored in a removable memory, such as a portable compact disc, portable digital video disc, or other removable media. The computer program 550 may also be embodied in a carrier such as an electronic signal, optical signal, radio signal, or computer readable storage medium.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 17:
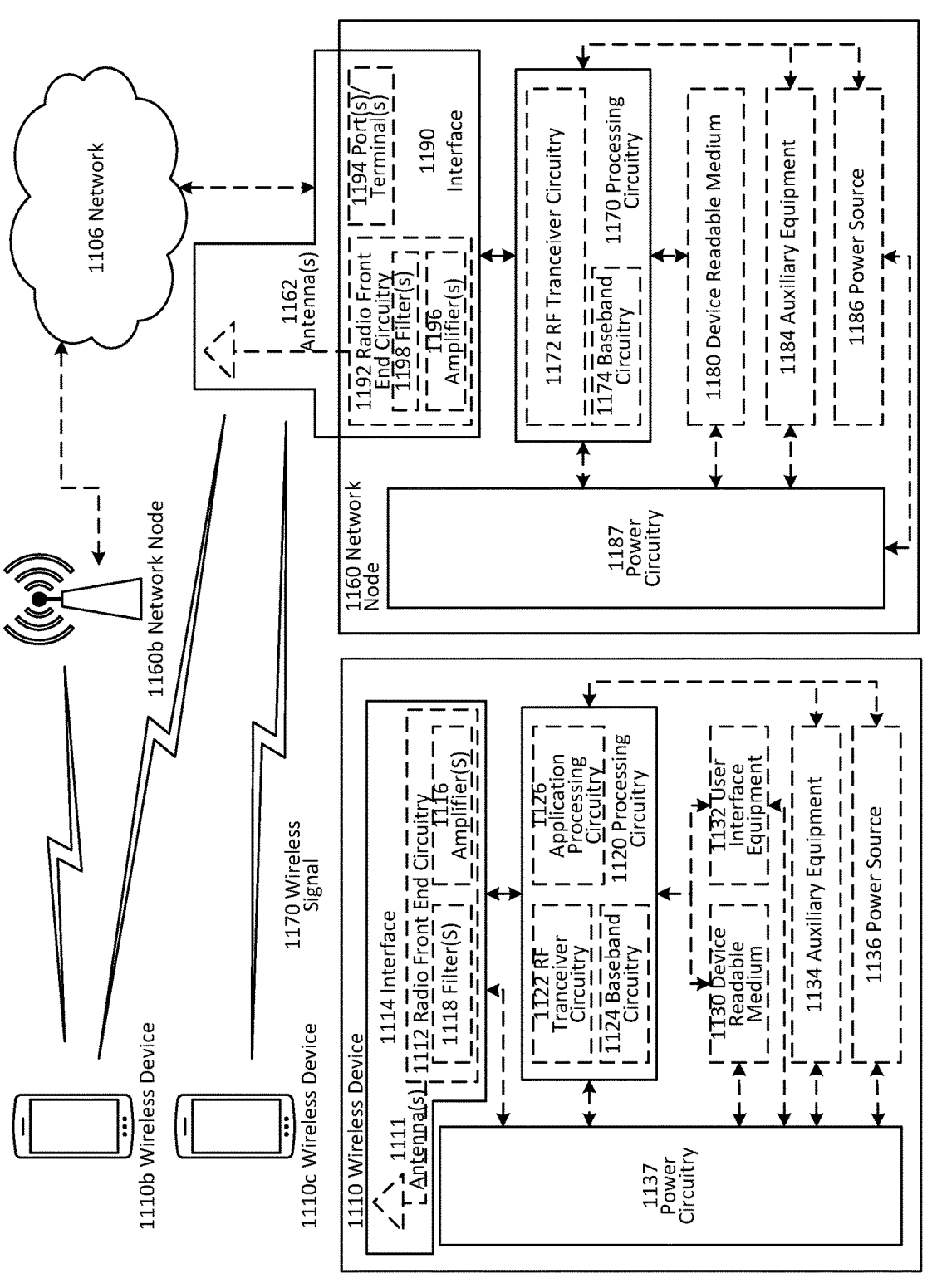
FIG. 17 is a schematic block diagram illustrating an example wireless network, according to particular embodiments of the present disclosure.

Although the subject matter described herein may be implemented in any appropriate type of system using any suitable components, the embodiments disclosed herein are described in relation to a wireless network, such as the example wireless network illustrated in FIG. 17. For simplicity, the wireless network of FIG. 17 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 17, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 17 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 17 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 18:
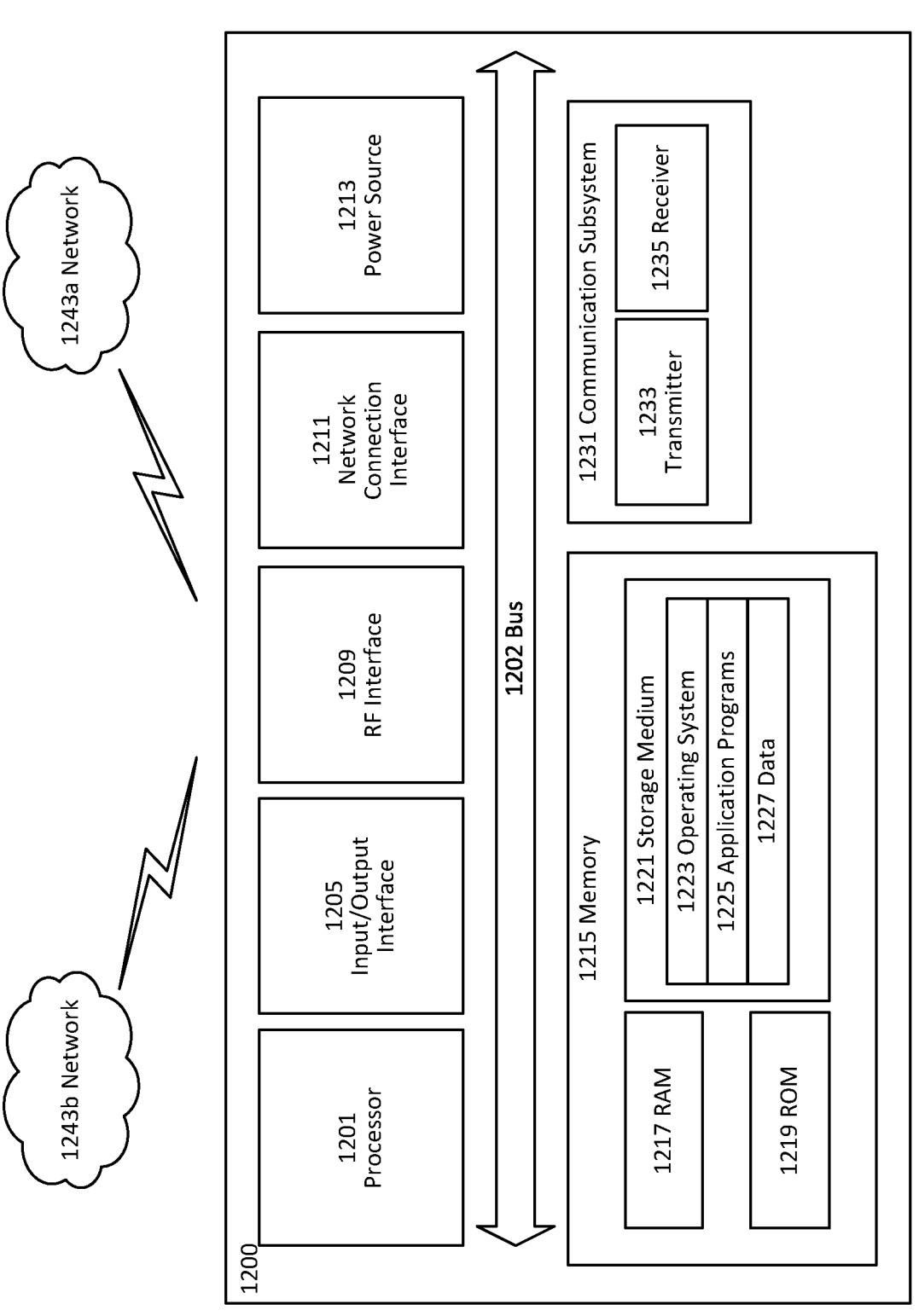
FIG. 18 is a schematic block diagram illustrating an example of a user equipment, according to particular embodiments of the present disclosure.

FIG. 18 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 18, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 18 is a UE, the components discussed herein are equally applicable to a WD, and vice-versa.

In FIG. 18, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 18, or only a subset of the components. The level of integration between the components may vary from one UE to another UE. Further, certain UEs may contain multiple instances of a component, such as multiple processors, memories, transceivers, transmitters, receivers, etc.

In FIG. 18, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 18, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 18, processing circuitry 1201 may be configured to communicate with network 1243*b* using communication subsystem 1231. Network 1243*a* and network 1243*b* may be the same network or networks or different network or networks. Communication subsystem 1231 may be configured to include one or more transceivers used to communicate with network 1243*b*. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.18, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243*b* may encompass wired and/or wireless networks such as a local-area network (LAN), a wide-area network (WAN), a computer network, a wireless network, a telecommunications network, another like network or any combination thereof. For example, network 1243*b* may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 19:
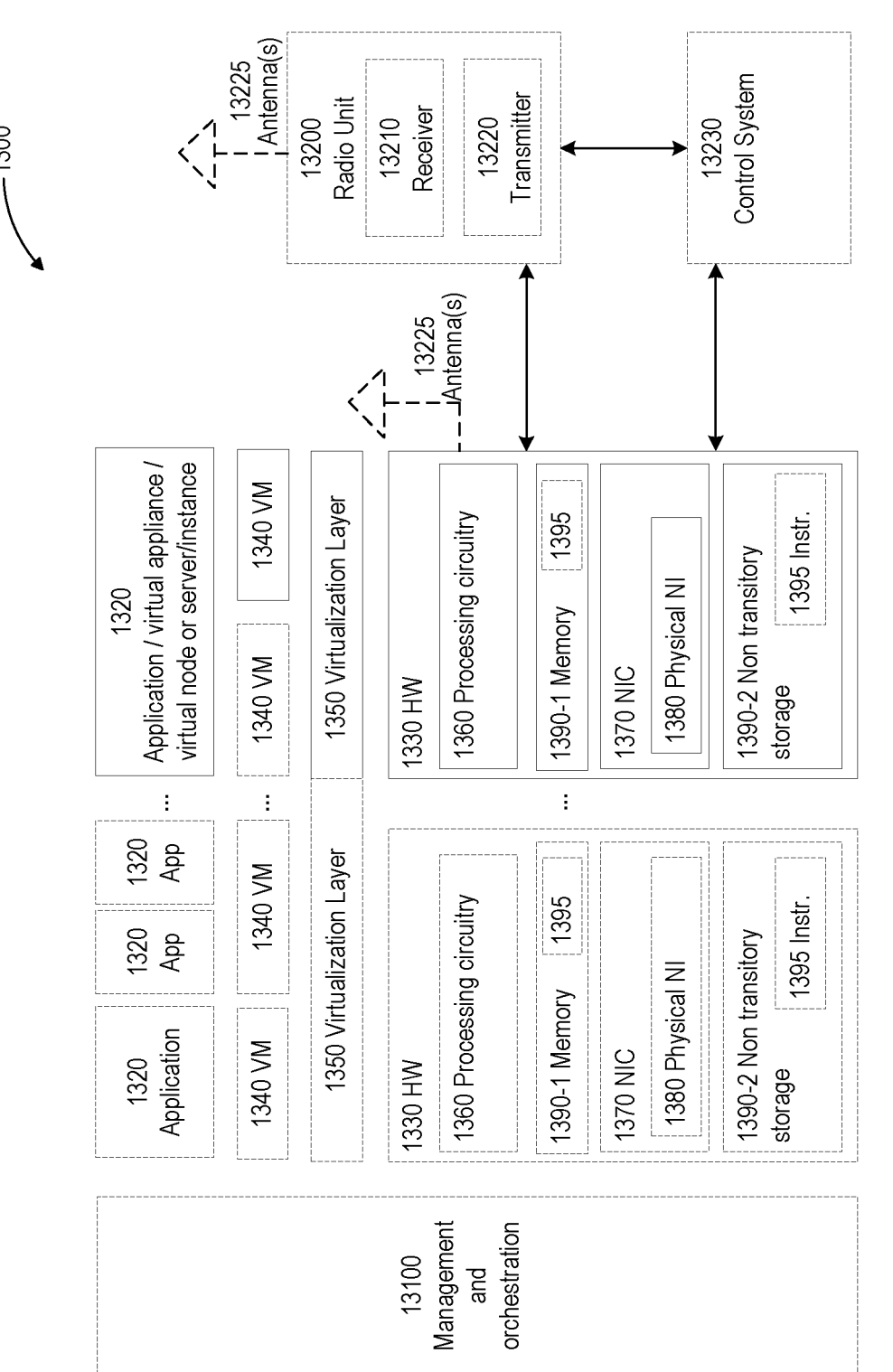
FIG. 19 is a schematic block diagram illustrating an example of a virtualization environment, according to particular embodiments of the present disclosure.

FIG. 19 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 19, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 19.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 20:
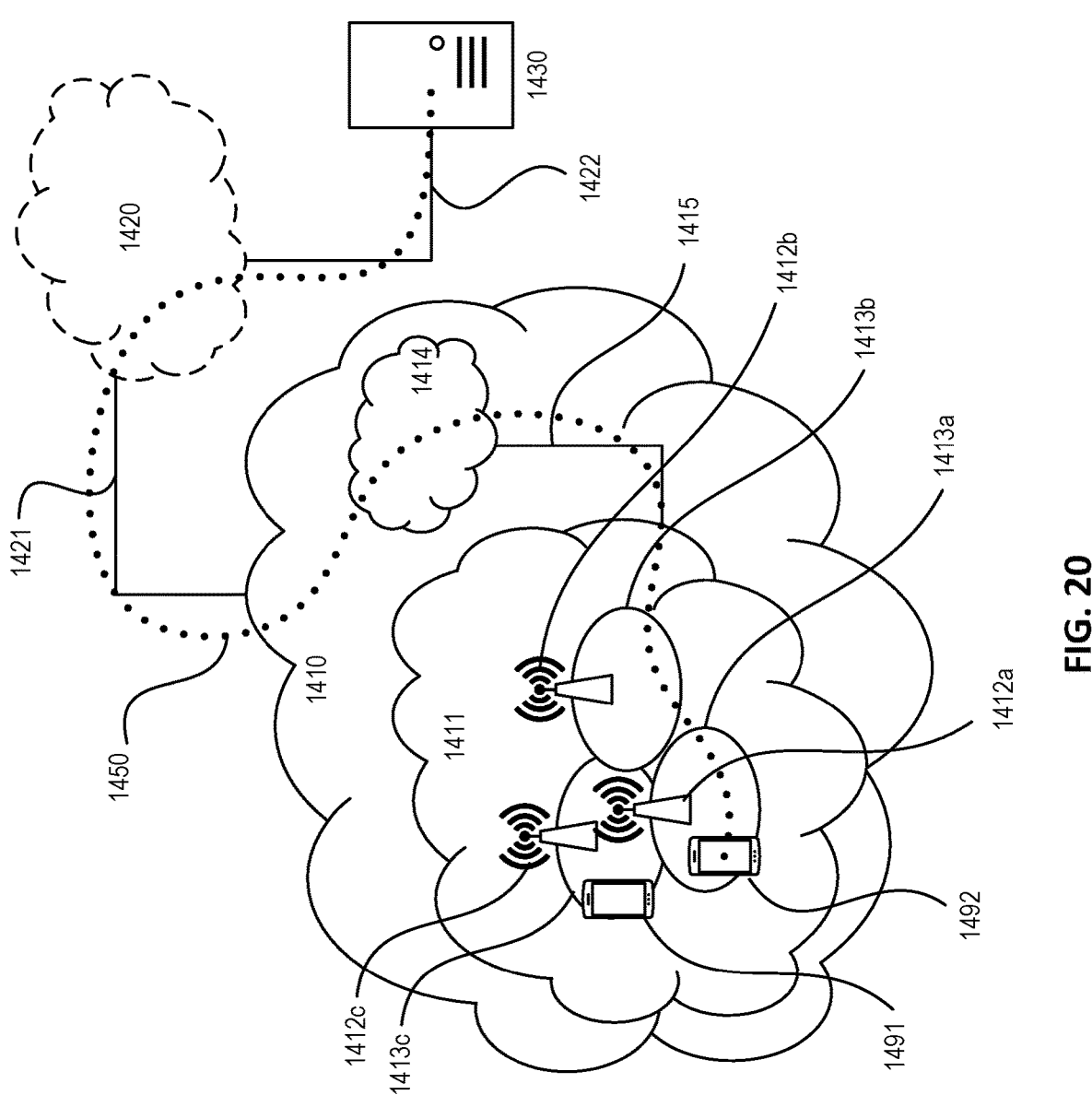
FIG. 20 is a schematic illustrating an example telecommunication network, according to particular embodiments of the present disclosure.

FIG. 20 illustrates a telecommunication network connected via an intermediate network to a host computer in accordance with some embodiments. In particular, with reference to FIG. 20, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 20 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 21:
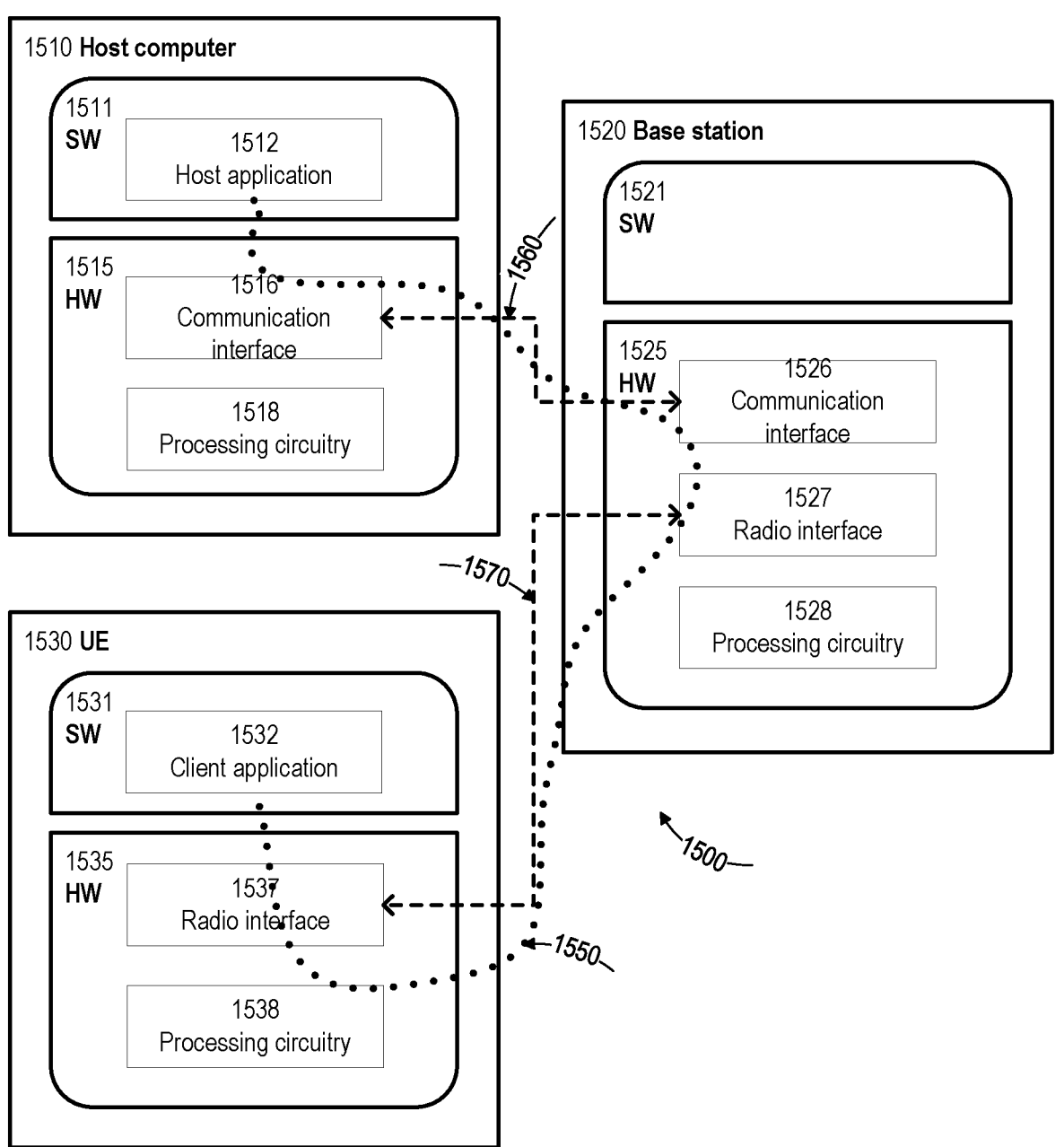
FIG. 21 is a schematic block diagram illustrating an example communication system, according to particular embodiments of the present disclosure.

Example implementations, in accordance with an embodiment, of the UE, base station and host computer discussed in the preceding paragraphs will now be described with reference to FIG. 21. FIG. 21 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 21) served by base station 1520. Communication interface 1526 may be configured to facilitate connection 1560 to host computer 1510. Connection 1560 may be direct or it may pass through a core network (not shown in FIG. 21) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 21 may be similar or identical to host computer 1430, one of base stations 1412*a*, 1412*b*, 1412*c* and one of UEs 1491, 1492 of FIG. 20, respectively. This is to say, the inner workings of these entities may be as shown in FIG. 21 and independently, the surrounding network topology may be that of FIG. 20.

In FIG. 21, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the reliability and latency during handover and thereby provide benefits such as improved QoS and better user experience.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 22:
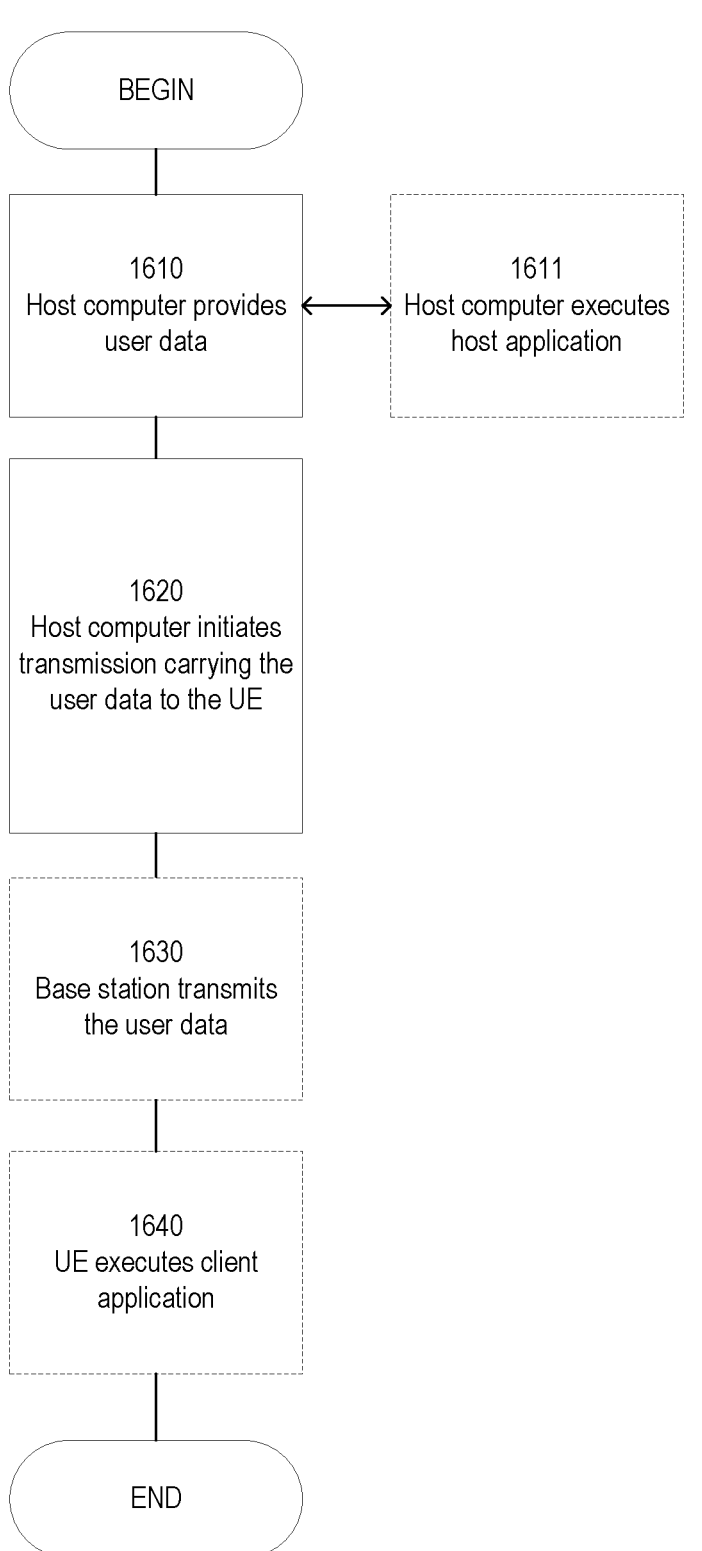
FIGS. 22-25 are flow diagrams, each of which illustrates an example method implemented in a communication system, according to particular embodiments of the present disclosure.

FIG. 22 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 22 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 23:
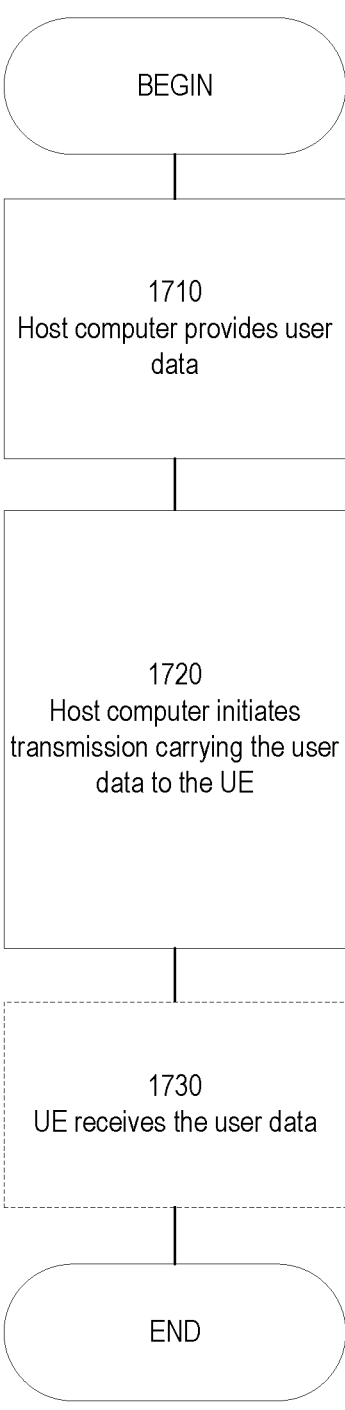

FIG. 23 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 23 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 24:
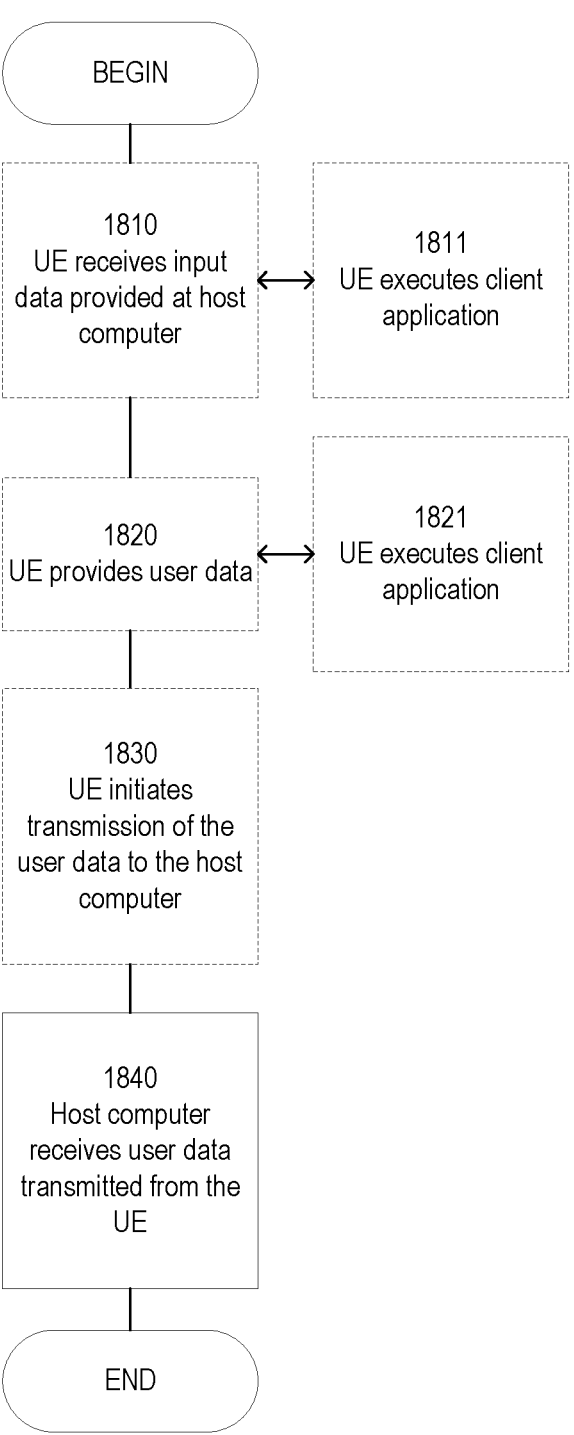

FIG. 24 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 24 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 25:
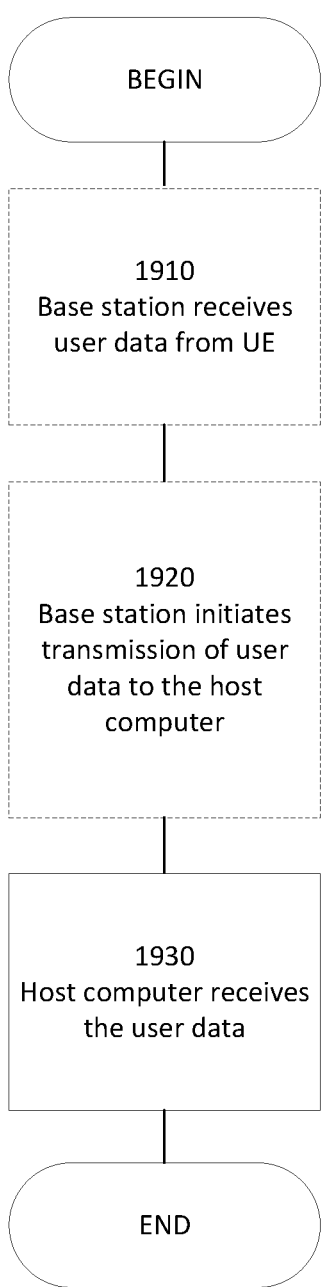

FIG. 25 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 25 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method of handover performed by a wireless device configured with first and second logical connections for communicating with a source base station, the method comprising:

receiving a handover command from a source base station while the wireless device is configured to perform packet duplication, wherein the wireless device exchanges duplicate packets with the source base station using the first and second logical connections;

responsive to the handover command, configuring dual active protocol stacks with the source base station and target base station and moving the second logical connection to a target base station while maintaining the first logical connection to the source base station;

receiving a release command from the target base station; and responsive to the release command, configuring the wireless device for packet duplication with the target base station and moving the first logical connection to the target base station.

2. The method of claim 1, wherein the handover command includes an indication to perform a dual active protocol stack (DAPS) handover.

3. The method of claim 2, wherein the indication applies to a specific radio bearer.

4. The method of claim 1, further comprising:

exchanging uplink and downlink data with the source base station while the second logical connection is being moved;

terminating uplink transmission to the source base station after the second logical connection has been moved to the target base station while continuing to receive downlink data from the source base station; and terminating reception of downlink data from the source base station when the first logical connection is moved to the target base station.

5. The method of claim 1, wherein moving the first and second logical connections to the target base station comprise:

releasing corresponding RLC entities for the first and second logical connections associated for the source base station; and establishing new RLC entities for the first and second logical connections associated with the target base station.

6. The method of claim 1, wherein the first and second logical connections are moved to the target base station without releasing corresponding radio link control (RLC) entities for the first and second logical connections.

7. The method of claim 1, wherein moving the first and second logical connections to the target base station comprise:

moving the second logical connection to the target base station comprises reconfiguring logical channel transmission restrictions to associate the RLC entity for the second logical connection with the target base station; and moving the first logical connection to the target base station comprises reconfiguring logical channel transmission restrictions to associate the RLC entity for the first logical connection with the target base station.

8. The method of claim 1, further comprising receiving first configuration information from the source base station for configuring dual active protocol stacks for the handover.

9. The method of claim 8, wherein:

at least a part of the first configuration information is received with the handover command in a radio resource control (RRC) message; or at least a part of the first configuration information is received in a RRC message separate from the RRC message carrying the handover command.

10. The method of claim 1, further comprising:

moving the second logical connection to the target base station comprises applying separate header compression and security contexts to first and second logical connections; and moving the first logical connection to the target base station comprises applying common header compression and security contexts to first and second logical connection.

11. The method of claim 1, further comprising receiving second configuration information from the target base station (for configuring packet duplication with the target base station.

12. The method of claim 11, wherein:

at least a part of the second configuration information is received with the release command in a RRC message; or at least a part of the second configuration information is received in a RRC message separate from the RRC message carrying the release command.

13. The method of claim 1, wherein:

the first and second logical connections are associated with first and second cells respectively of the source base station and are moved to first and second cells respectively of the target base station; or the first and second logical connections are associated with first and second transmission points respectively of the source base station.

14. A method implemented by a source base station to handover a wireless device configured for packet duplication to a target base station, the method comprising:

determining a need to handover a wireless device;

sending a handover command to the wireless device to initiate handover to the target base station while the wireless device is configured for packet duplication wherein the wireless device exchanges duplicate packets with the source base station using first and second logical connections; and maintaining the first logical connection with the wireless device while the wireless device moves the second logical connection to a target base station; and receiving a handover message from the target base station indicating successful handover; and responsive to the handover message, releasing the first logical connection with the wireless device.

15. The method of claim 14, wherein:

the handover command includes an indication to perform a dual active protocol stack (DAPS) handover; or the indication applies to a specific radio bearer further comprising:

forwarding downlink packets to the target base station; or sending configuration information to the wireless device to configure dual protocols stacks for the handover.

16. The method of claim 15, wherein at least a part of the configuration information is transmitted with the handover command in a radio resource control (RRC) message; or, wherein at least a part of the configuration information is received in a RRC message separate from RRC message containing the handover command.

17. The method of claim 14, wherein:

the first and second logical connections are associated with first and second cells respectively of the source base station and are moved to first and second cells respectively of the target base station; or the first and second logical connections are associated with first and second source transmission points respectively of the source base station.

18. A method implemented by a target base station to handover a wireless device configured for packet duplication from a source base station, the method comprising:

receiving a handover request message from the source base station serving a wireless device configured to perform packet duplication wherein the wireless device exchanges duplicate packets with the source base station using first and second logical connections;

responsive to the handover request message, establishing the second logical connection with the wireless device while the wireless device continues to exchange data with the source base station using the first logical connection;

sending a release command to the wireless device, the release command including an indication to configure packet duplication for communication with the target base station wherein the wireless device exchanges duplicate packets with the target base station using the first and second logical connections; and establishing the first logical connection with the wireless device while maintaining the second logical connection to configure the target base station for packet duplication.

19. The method of claim 18, wherein:

the indication applies to a specific radio bearer; or the indication applies to a specific radio bearer further comprising:

sending configuration information to the wireless device to configure packet duplication for communication with the target base station.

20. The method of claim 19, wherein at least a part of the configuration information is received with the release command in a radio resource control (RRC) message.

21. The method of claim 20, wherein:

the first and second logical are associated with first and second cells respectively of the source base station and are moved to first and second cells respectively of the target base station; or the first and second logical connections are associated with first and second source transmission points respectively of the source base station.

22. A wireless device configured with first and second logical connections for communicating with a source base station, the wireless device comprising:

communication circuitry for communicating with base stations in a wireless communication network; and processing circuitry operatively coupled to the communication circuitry and configured to:

receive a handover command from a source base station while the wireless device is configured to perform packet duplication wherein the wireless device exchanges duplicate packets with the source base station using the first and second logical connections;

responsive to the handover command, configure dual active protocol stacks with the source base station and target base station and moving the second logical connection to a target base station while maintaining the first logical connection to the source base station;

receive a release command from the target base station; and responsive to the release command, configure the wireless device to perform packet duplication for communication with the target base station and moving the first logical connection to the target base station.

23. A source base station configured to handover a wireless device for packet duplication to a target base station, the source base station comprising:

communication circuitry for communicating with a wireless device in a wireless communication network; and processing circuitry operatively coupled to the communication circuitry and configured to:

determine a need to handover a wireless device;

send a handover command to the wireless device to initiate handover to the target base station while the wireless device is configured for packet duplication wherein the wireless device exchanges duplicate packets with the source base station using first and second logical connections; and maintain the first logical connection with the wireless device while the wireless device moves the second logical connection to a target base station; and receive a handover message from the target base station indicating successful handover; and responsive to the handover message, release the first logical connection with the wireless device.

24. A target base station configured to handover wireless device configured for packet duplication from a source base station, the target base station comprising:

communication circuitry for communicating with a wireless device in a wireless communication network; and processing circuitry operatively coupled to the communication circuitry and configured to:

receive a handover request message from the source base station serving a wireless device configured to perform packet duplication wherein the wireless device exchanges duplicate packets with the source base station using first and second logical connections;

responsive to the handover request message, establish the second logical connection with the wireless device while the wireless device continues to exchange data with the source base station using the first logical connection;

send a release command to the wireless device, the release command including an indication to configure packet duplication for communication with the target base station wherein the wireless device exchanges duplicate packets with the target base station using the first and second logical connections; and establish the first logical connection with the wireless device while maintaining the second logical connection to configure the target base station for packet duplication.

* * * * *